(12) United States Patent
Bartel et al.

(10) Patent No.: US 11,771,171 B2
(45) Date of Patent: Oct. 3, 2023

(54) COMPOSITE PLATE FOR AN ARTICLE OF FOOTWEAR

(71) Applicant: NIKE, Inc., Beaverton, OR (US)

(72) Inventors: Aaron Bartel, Beaverton, OR (US); Sam Lacey, Portland, OR (US); Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 40 days.

(21) Appl. No.: 17/239,445

(22) Filed: Apr. 23, 2021

(65) Prior Publication Data

US 2021/0235812 A1 Aug. 5, 2021

Related U.S. Application Data

(63) Continuation of application No. 16/254,975, filed on Jan. 23, 2019, now Pat. No. 10,986,892.

(Continued)

(51) Int. Cl.
*A43B 13/02* (2022.01)
*A43B 13/04* (2006.01)
(Continued)

(52) U.S. Cl.
CPC ............. *A43B 13/026* (2013.01); *A43B 5/02* (2013.01); *A43B 13/04* (2013.01); *A43B 13/12* (2013.01);
(Continued)

(58) Field of Classification Search
CPC ......... A43B 13/026; A43B 5/02; A43B 13/04; A43B 13/12; A43B 13/186; A43B 13/26;
(Continued)

(56) References Cited

U.S. PATENT DOCUMENTS

| 2004/0074589 A1 | 4/2004 | Gessler et al. |
| 2011/0041359 A1 | 2/2011 | Dojan et al. |

(Continued)

FOREIGN PATENT DOCUMENTS

| AT | 511349 B1 | 11/2012 |
| EP | 1125728 A1 | 8/2001 |

OTHER PUBLICATIONS

China National Intellectual Property Administration, First Office Action dated Jul. 20, 2021 for application No. 201980019924.7.

(Continued)

*Primary Examiner* — Brent T O'Hern
(74) *Attorney, Agent, or Firm* — Honigman LLP; Matthew H. Szalach; Jonathan P. O'Brien

(57) ABSTRACT

A stitched article includes a substrate and a first strand portion formed from a bundle of fibers. The substrate has a first region and a second region. The first strand portion is attached to the substrate in the first region and in the second region via a series of stitches formed with a thread and forms a first layer on the substrate. The article has a first concentration of the stitches in the first region along a first length of the strand portion and a second concentration of the stitches different than the first concentration in the second region along a second length of the first strand portion.

19 Claims, 13 Drawing Sheets

Related U.S. Application Data

(60) Provisional application No. 62/621,193, filed on Jan. 24, 2018.

(51) Int. Cl.

| | |
|---|---|
| *A43B 5/02* | (2006.01) |
| *A43C 15/16* | (2006.01) |
| *A43C 15/02* | (2006.01) |
| *B29C 70/22* | (2006.01) |
| *A43B 13/12* | (2006.01) |
| *B29D 35/00* | (2010.01) |
| *A43B 13/26* | (2006.01) |
| *A43B 13/18* | (2006.01) |

(52) U.S. Cl.
CPC ............ *A43B 13/186* (2013.01); *A43B 13/26* (2013.01); *A43C 15/02* (2013.01); *A43C 15/16* (2013.01); *B29C 70/226* (2013.01); *B29D 35/0054* (2013.01)

(58) Field of Classification Search
CPC ....... A43C 15/02; A43C 15/16; B29C 70/226; B29D 35/0054
USPC ........................................................ 428/102
See application file for complete search history.

(56) References Cited

U.S. PATENT DOCUMENTS

2016/0286898 A1* 10/2016 Manz .................. A43B 23/026
2017/0095033 A1    4/2017 Farina et al.

OTHER PUBLICATIONS

European Patent Office as ISA, International Search Report and Written Opinion for PCT Application No. PCT/US2019/014703, dated Apr. 1, 2019.

European Patent Office as IPEA, International Preliminary Report on Patentability for PCT Application No. PCT/US2019/014703, dated Dec. 17, 2019.

* cited by examiner

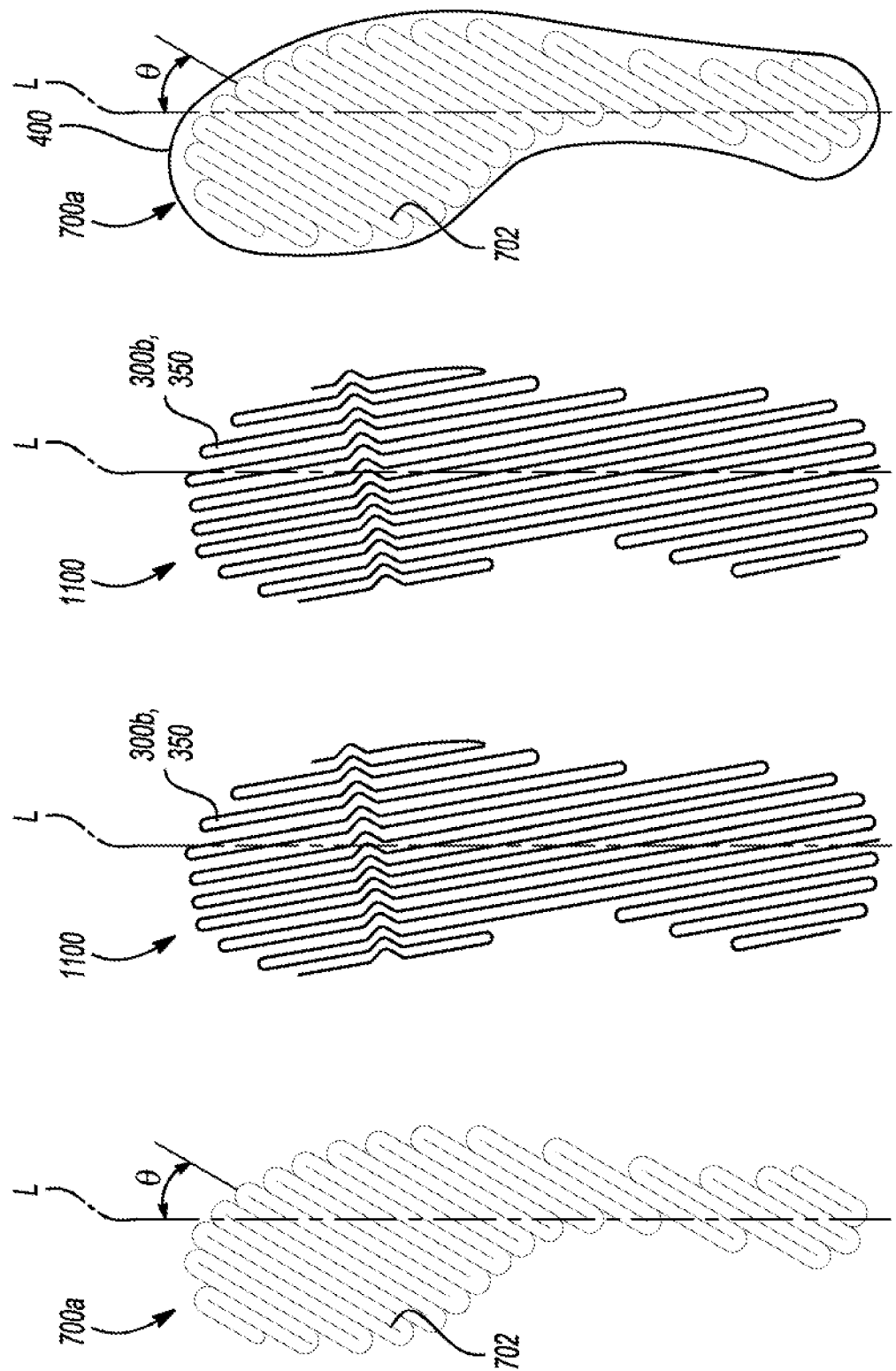

COMPOSITE PLATE FOR AN ARTICLE OF FOOTWEAR

CROSS REFERENCE TO RELATED APPLICATION

This application is a continuation of U.S. application Ser. No. 16/254,975, filed Jan. 23, 2019, which claims priority under 35 U.S.C. § 119(e) to U.S. Provisional Application Ser. No. 62/621,193, filed Jan. 24, 2018, the disclosures of which are hereby incorporated by reference in their entirety.

FIELD

The present disclosure relates generally to footwear, and in particular the present disclosure relates to making a composite plate for an article of footwear.

BACKGROUND

This section provides background information related to the present disclosure which is not necessarily prior art.

Regions of composites that are to accommodate flexing, such as, for example, in bending regions where toes and joints connect metatarsal bones with phalanx bones of a foot, are more susceptible to crack propagation and fracturing as a result of repeated bending/flexing of the composite during use. Accordingly, in composite articles, fiber density is generally reduced in these bending regions in order to reduce the stiffness to allow for bending at the cost of decreasing the overall strength of the composite article.

DRAWINGS

The drawings described herein are for illustrative purposes only of selected configurations and not all possible implementations, and are not intended to limit the scope of the present disclosure.

Figure 4:
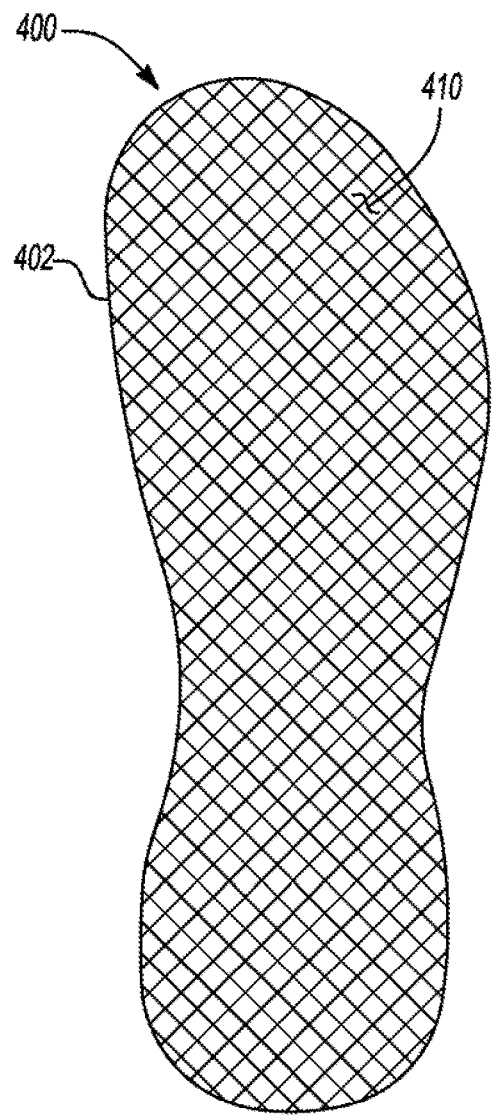
FIG. 4 is a top view of a substrate used to form a composite footwear plate for the article of footwear of FIG. 1.
Figure 5A:
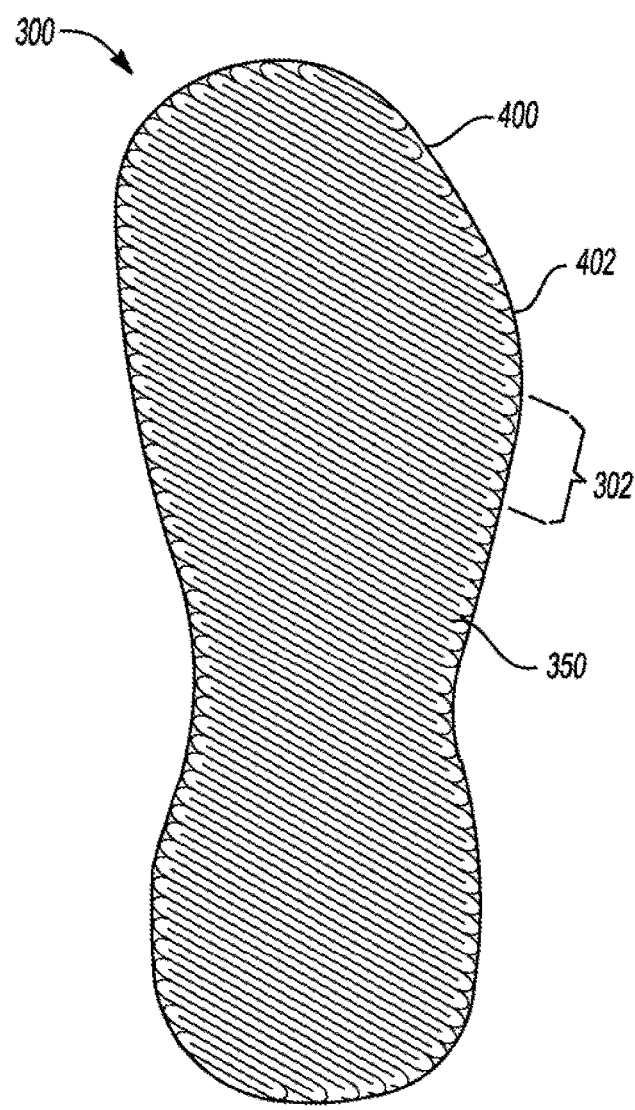
Figure 5B:
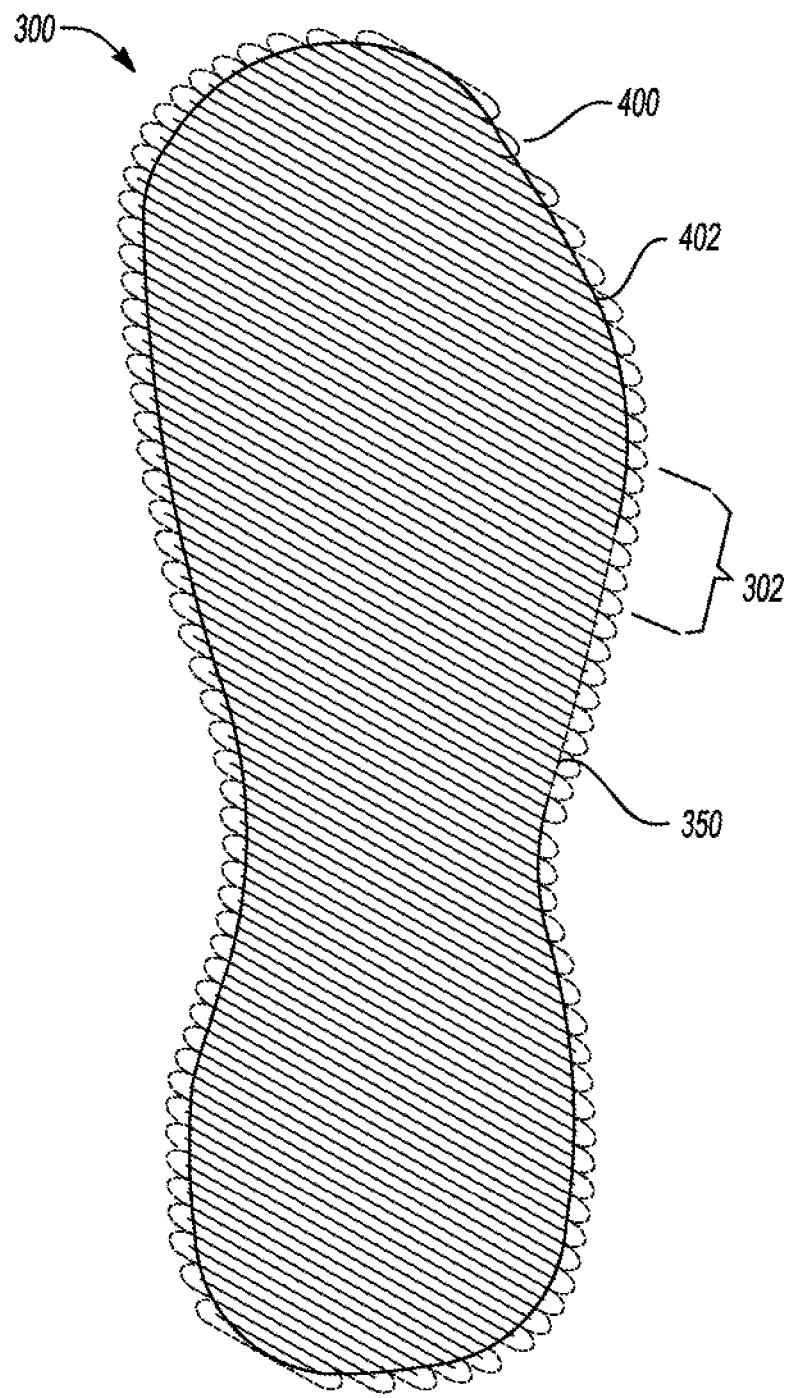
Figure 6A:
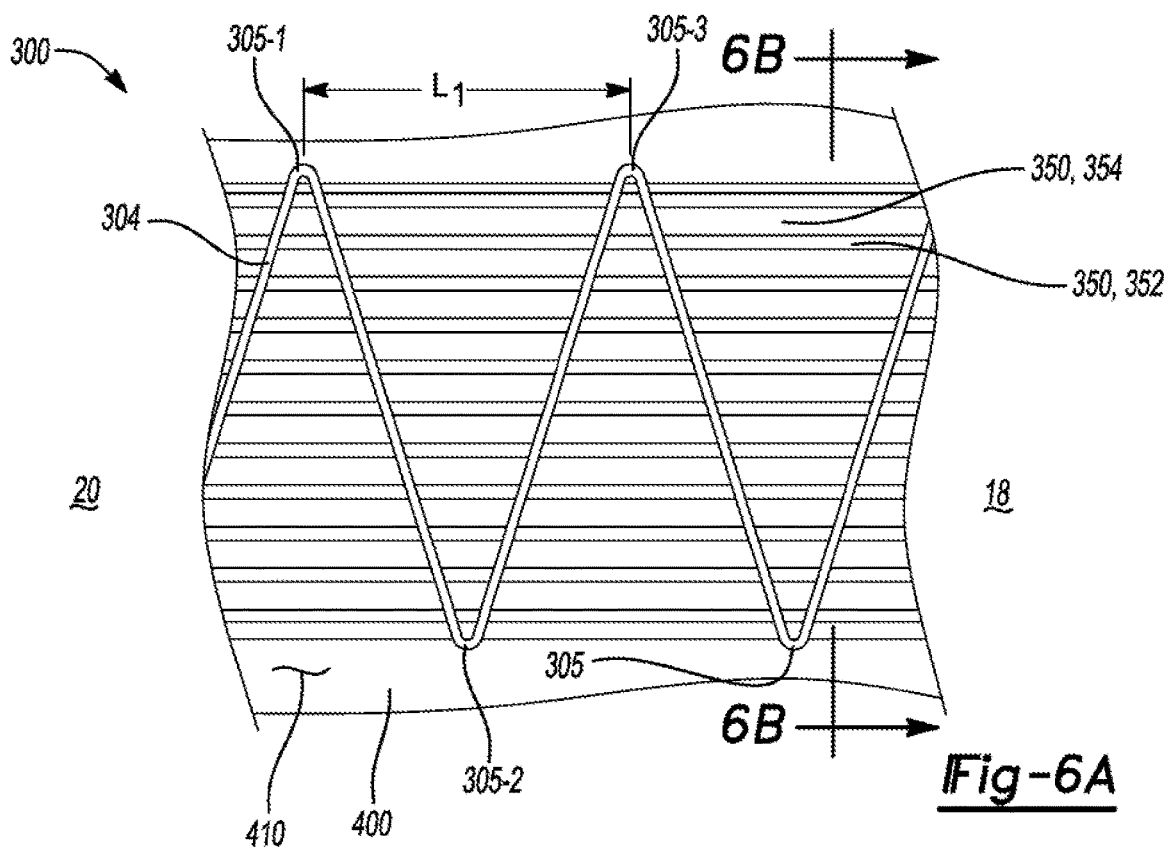
Figure 6B:
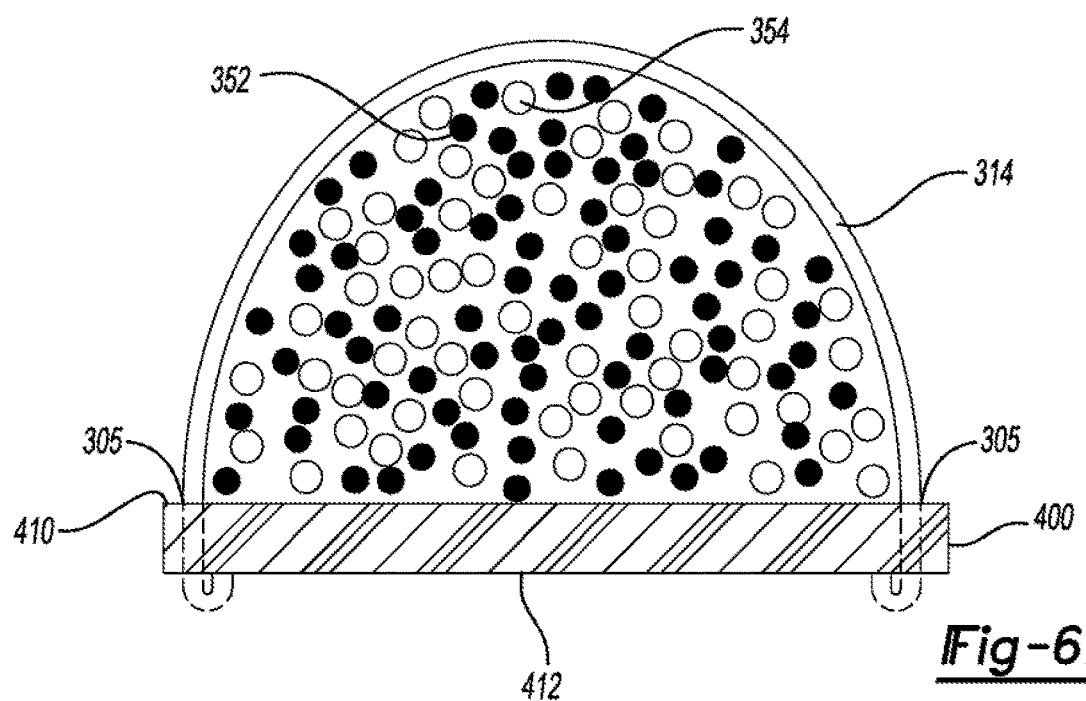
Figure 7:
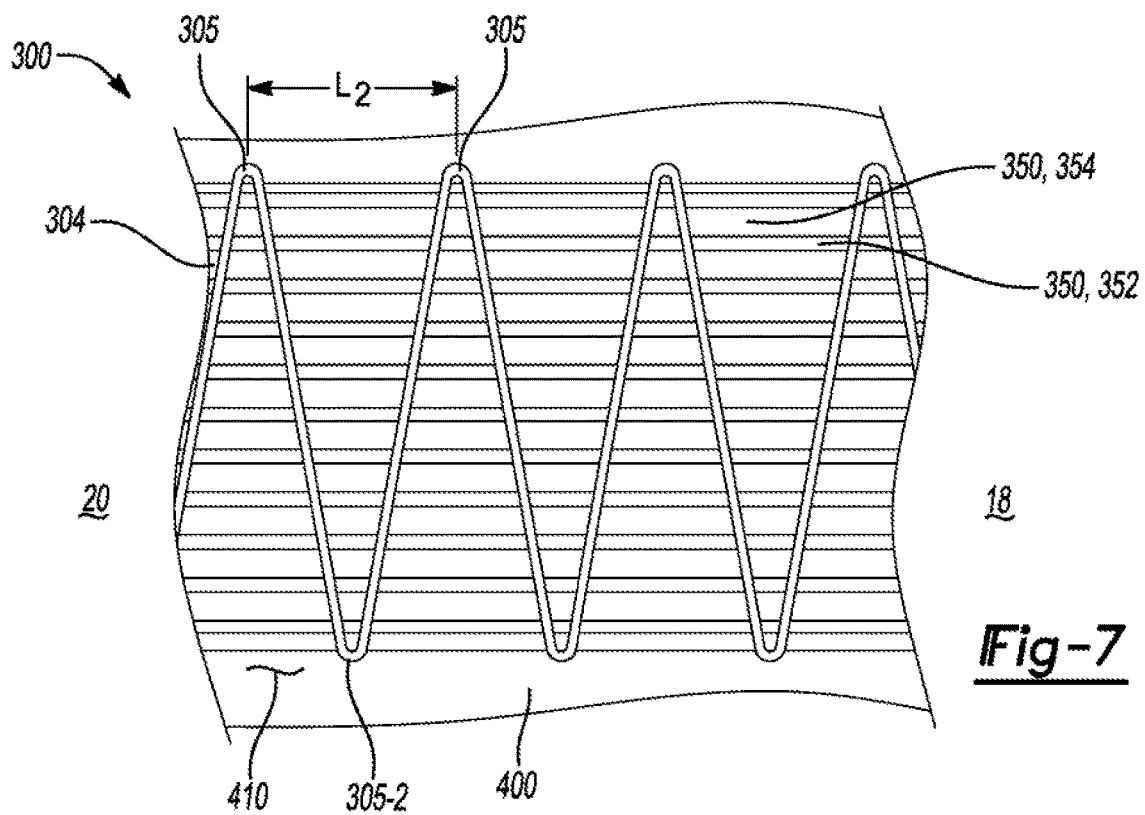
Figure 8:
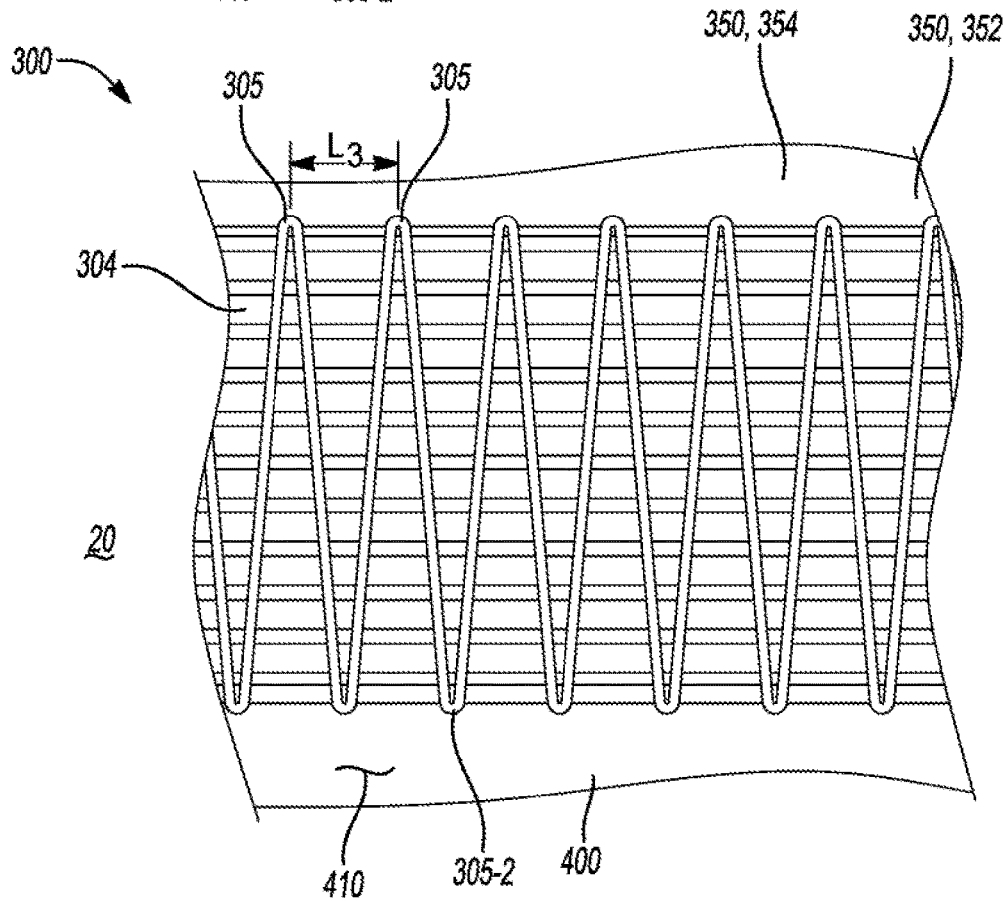
Figure 9:
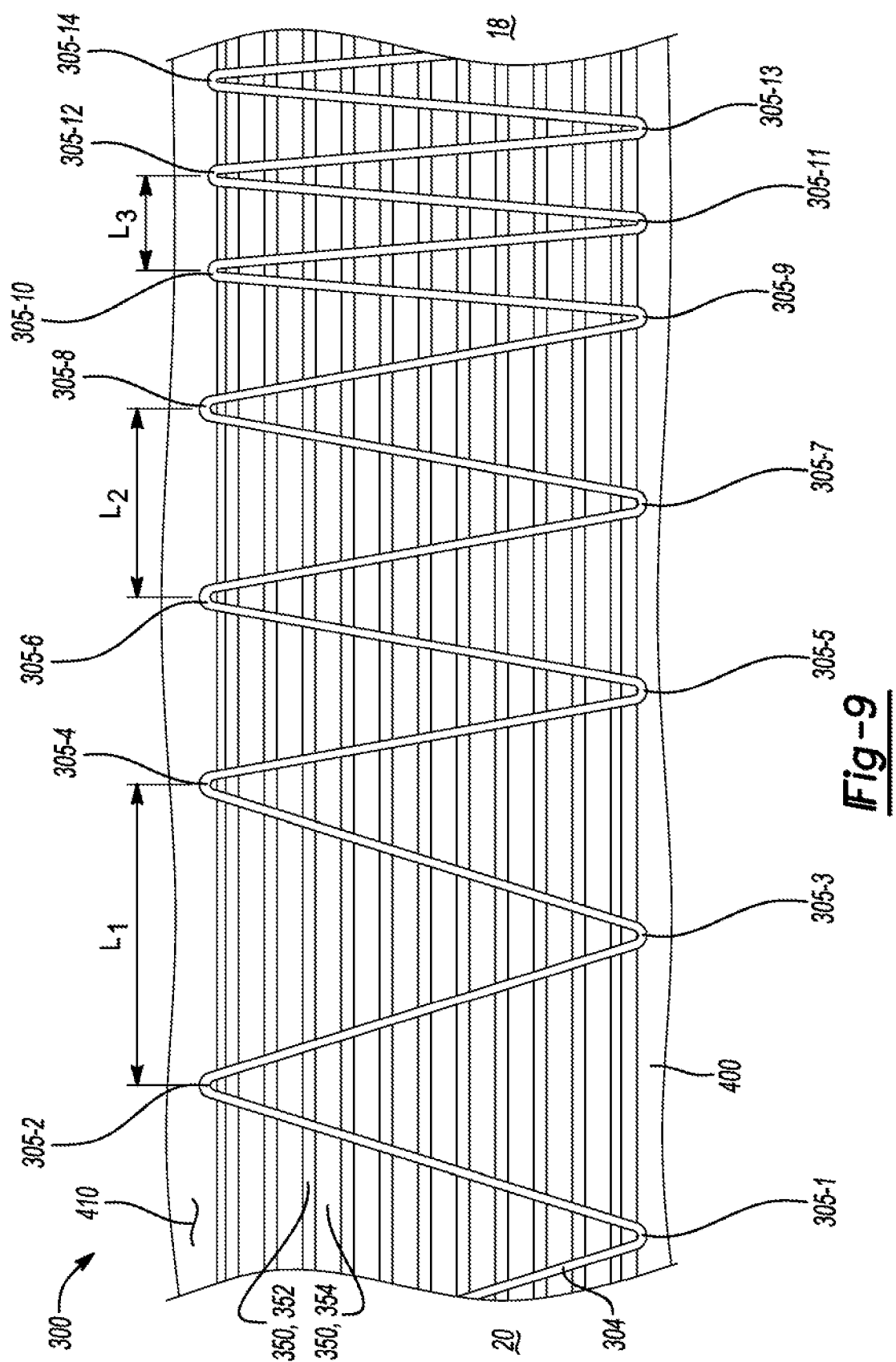
Figure 10:
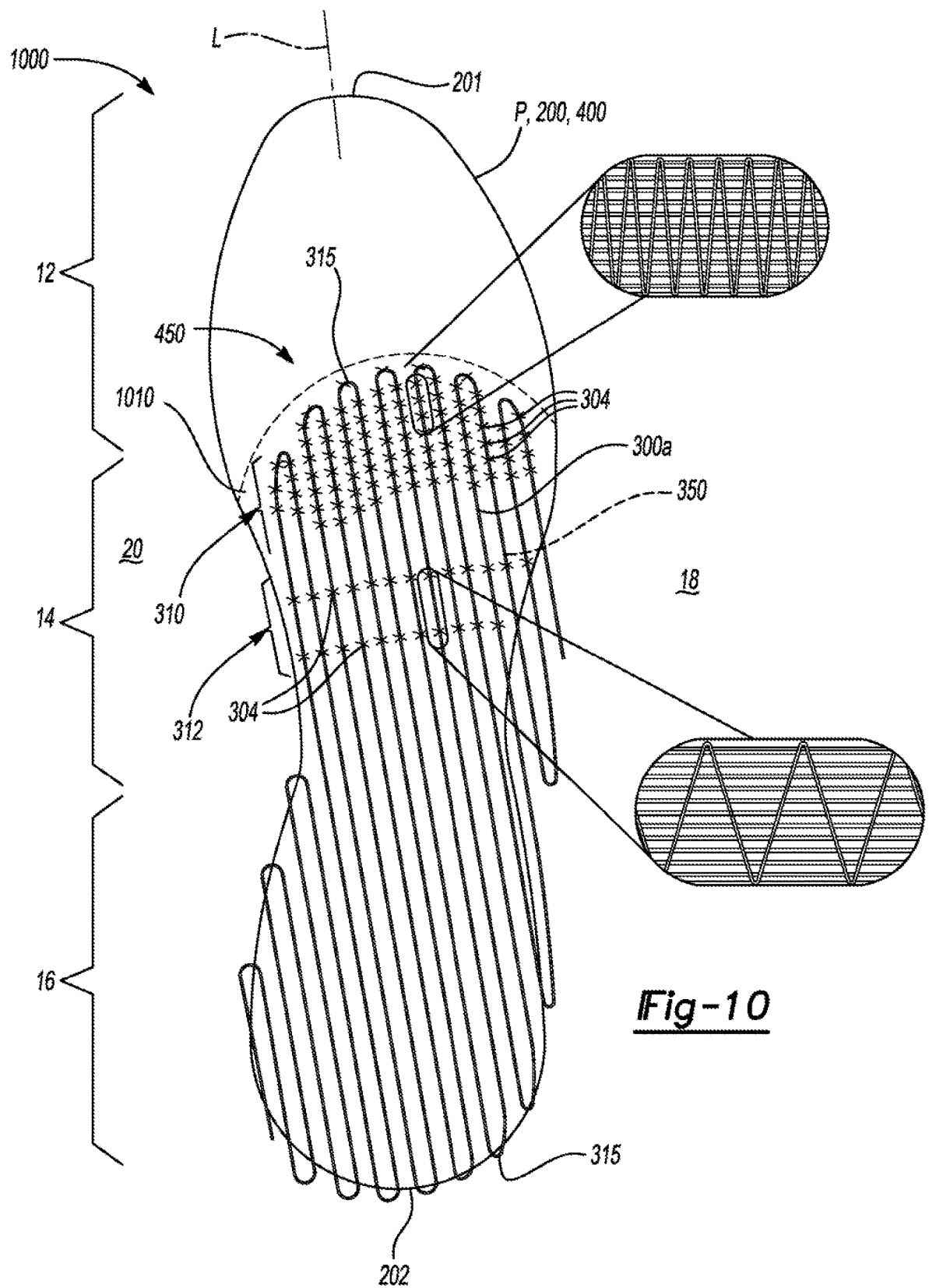
Figure 11:
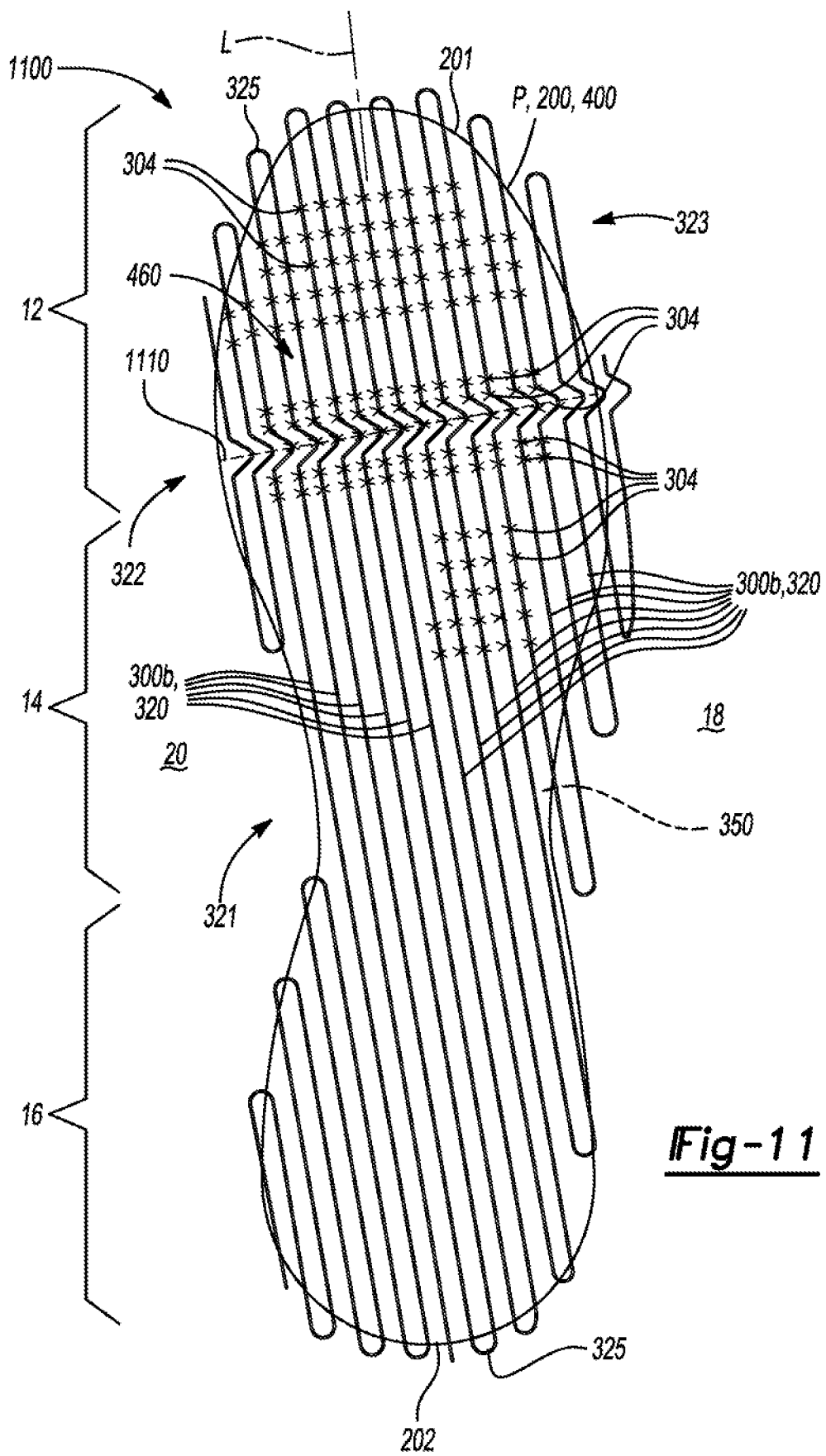
Figure 12:
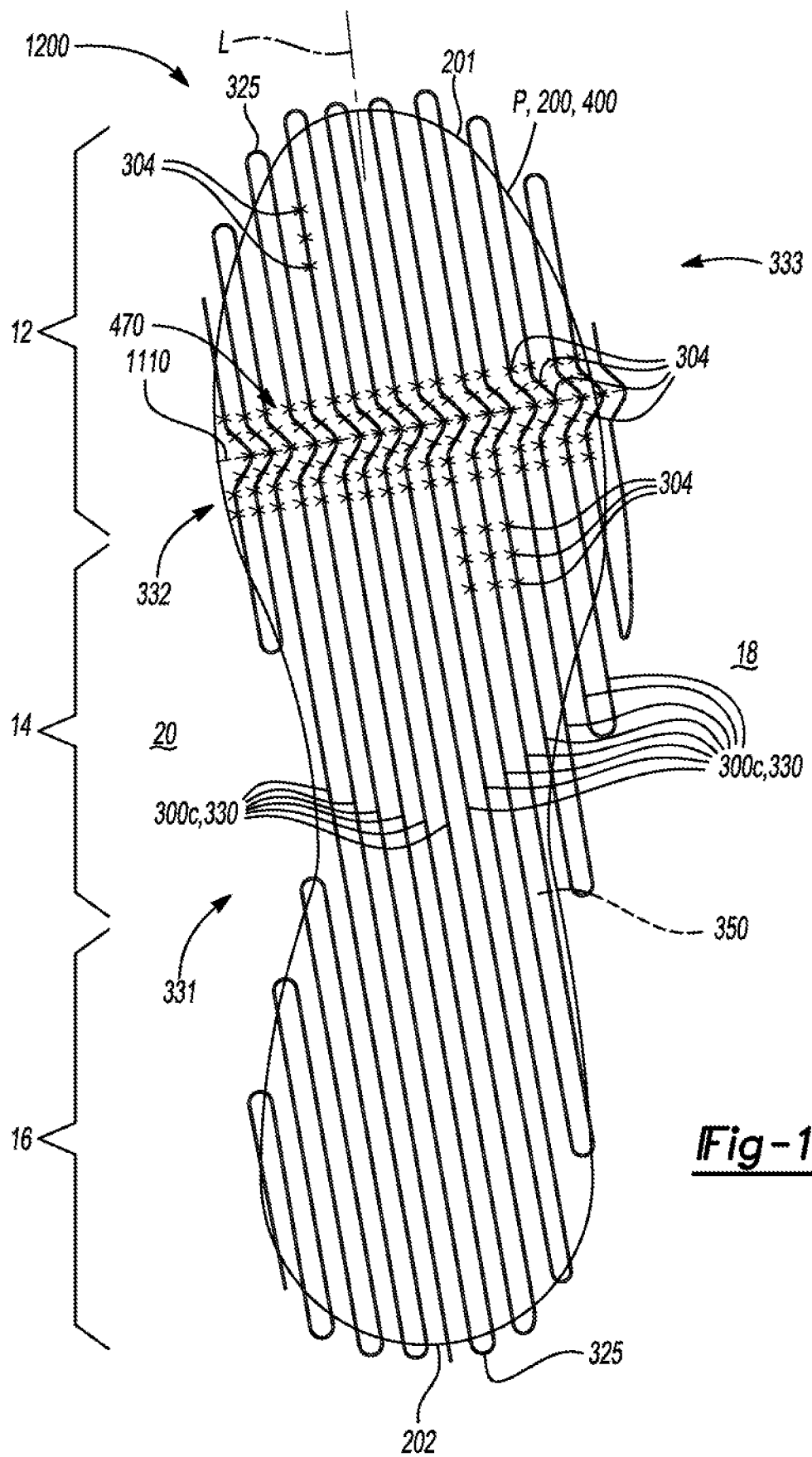
Figure 13:
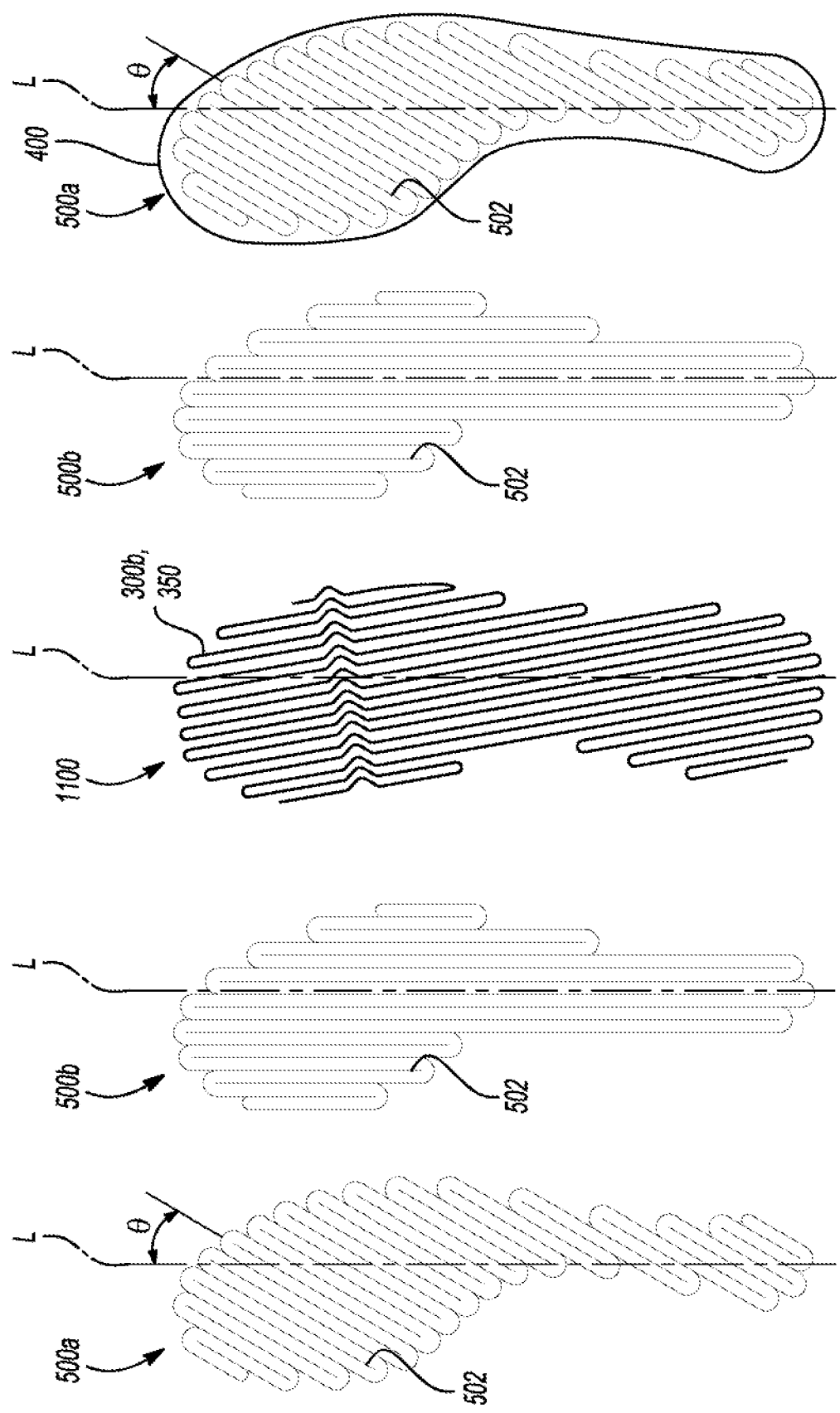
Figure 14:
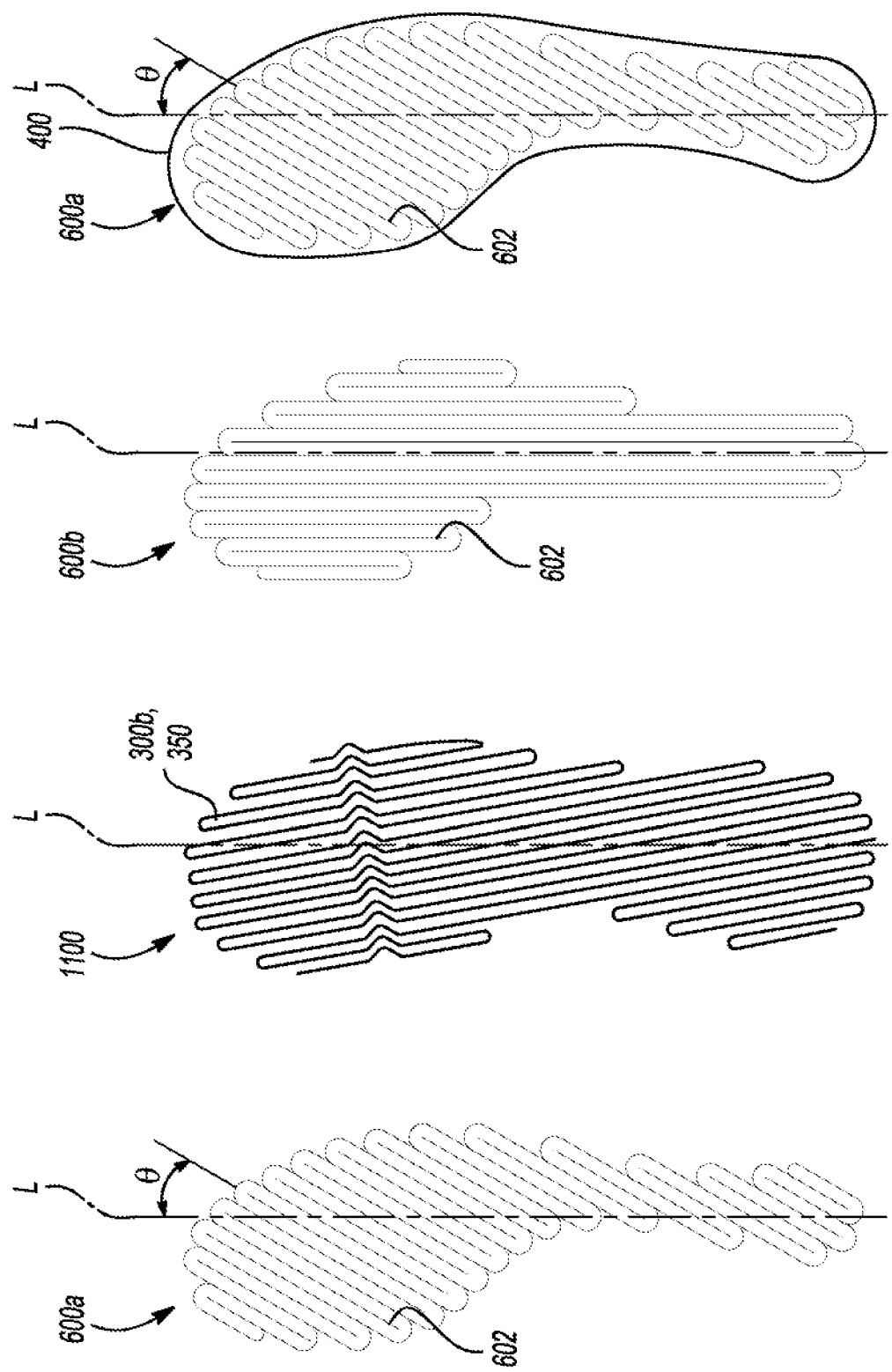
Figure 17:
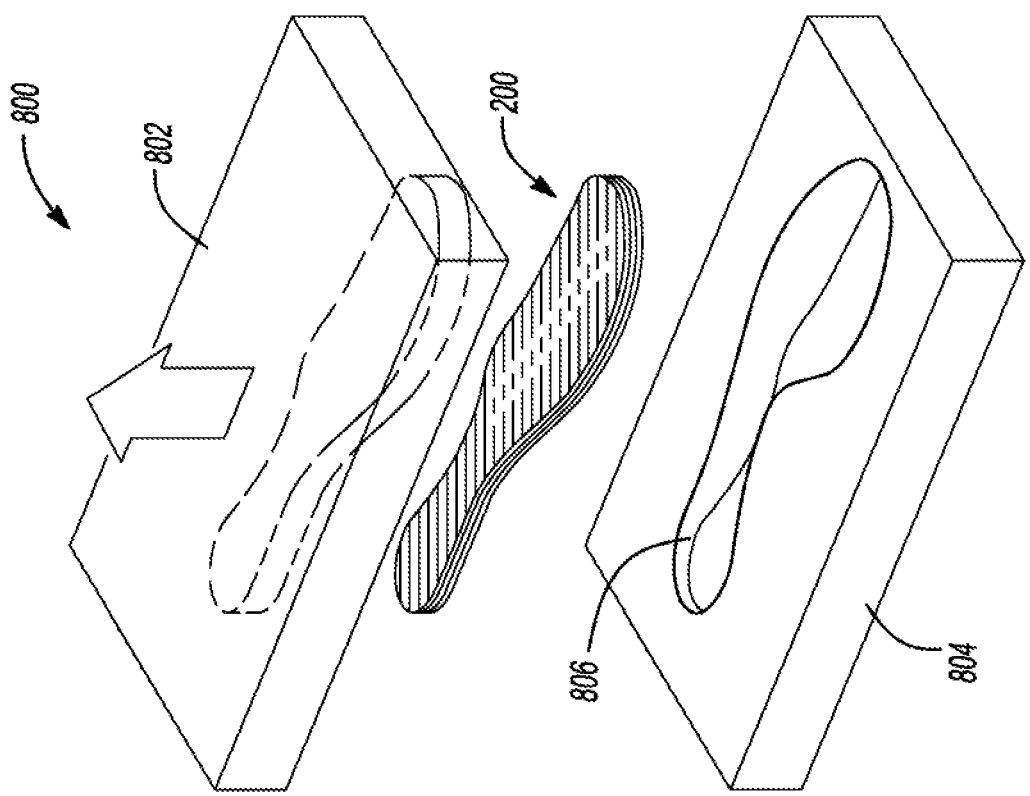
Figure 16:
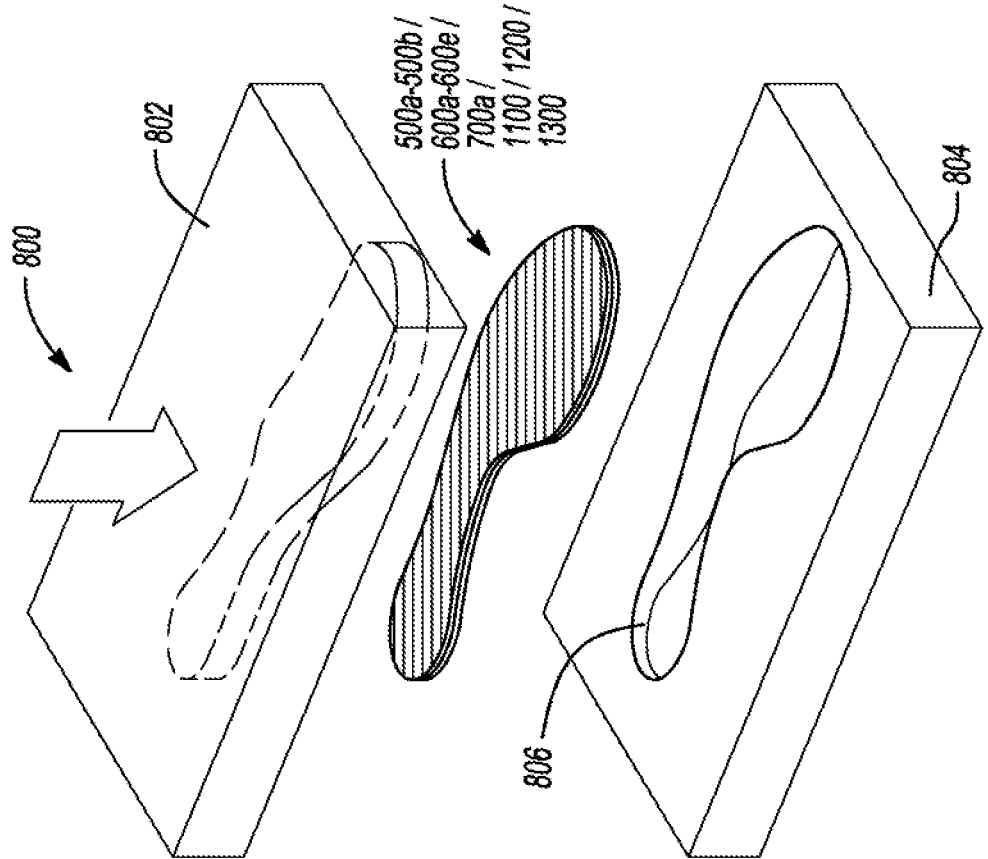

FIGS. 5A and 5B each provide a top view of a strand portion formed from bundle of fibers attached to the substrate of FIG. 4 and forming a first layer on the substrate;

FIG. 6A is a close up view of the bundle of fibers of FIG. 5 attached to the substrate in a heel region via stitching having a first concentration;

FIG. 6B is a cross-sectional view taken along line 6B-6B of FIG. 6A showing the stitching penetrating the substrate to attach the bundle of fibers to a top surface of the substrate and the fibers including non-polymer fibers and polymer fibers;

FIG. 7 is a close up view of the bundle of fibers of FIG. 5 attached to the substrate in a midfoot region via stitching having a second concentration that is greater than the first concentration of stitching in the heel region;

FIG. 8 is a close up view of the bundle of fibers of FIG. 6 attached to the substrate in a forefoot region via stitching having a third concentration that is greater than the second concentration of stitching in the midfoot region;

FIG. 9 is a close up view of a bundle of fibers attached to a substrate via stitching having a concentration that increases across a width of the substrate in accordance with principles of the present disclosure;

FIG. 10 is a top view of a corresponding layer of a footwear plate formed from a bundle of fibers having distal ends that terminate proximate to a flex zone in a forefoot region of the footwear plate in accordance with principles of the present disclosure;

FIG. 11 is a top view of a corresponding layer of a footwear plate formed from a bundle of fibers extending along a length of the footwear plate and having a curved orientation proximate to a flex zone in a forefoot region of the footwear plate in accordance with principles of the present disclosure;

FIG. 12 top view of a corresponding layer of a footwear plate formed from a bundle of fibers extending along a length of the footwear plate and having a curved orientation proximate to a flex zone in a forefoot region of the footwear plate in accordance with principles of the present disclosure;

FIGS. 13-15 each show various layers of fiber strands and the bundle of fibers of FIG. 11 used to form a corresponding footwear plate in accordance with principles of the present disclosure;

FIG. 16 is a perspective view of a mold for use in forming a footwear plate in accordance with the principles of the present disclosure, the mold shown in conjunction with a stack of fibers prior to being formed into the footwear plate; and FIG. 17 is a perspective view of a mold for use in forming a footwear plate in accordance with the principles of the present disclosure, the mold shown in conjunction with the formed footwear plate.

Corresponding reference numerals indicate corresponding parts throughout the drawings.

DETAILED DESCRIPTION

The present disclosure is directed to a stitched article having one or more bundles of fibers supported by a substrate. The bundles of fibers may be attached to the substrate via stitching to secure the bundles to the substrate at desired locations and/or in a desired pattern. The concentration of the stitching used to attach the bundles to the substrate may vary at different locations of the substrate to provide the substrate—once formed into a footwear plate, for example—to have different properties. For example, in areas where the plate is expected to flex and bend, the concentration of the stitching may be increased relative to other areas of the substrate in an effort to locally increase the flexibility of the formed plate while at the same time resisting cracking.

One aspect of the disclosure provides a stitched article. The stitched article includes a substrate having a first region and a second region. The stitched article also includes a first strand portion formed from a first bundle of fibers, attached to the substrate in the first region and in the second region via a series of stitches formed with a first thread, and forming a first layer on the substrate. The article has a first concentration of the stitches in the first region along a first length of the strand portion and a second concentration of the stitches different than the first concentration in the second region along a second length of the strand portion.

Implementations of the disclosure may include one or more of the following optional features. In some implementations, the stitches cross over the strand portion and penetrate the substrate at first attachment locations that are spaced apart from the strand portion. The stitches may also penetrate the strand portion. Optionally, the first length may extend in a direction between a medial side of the substrate and a lateral side of the substrate. Here, the second length extends in a direction between the medial side of the substrate and the lateral side of the substrate.

In some examples, the first concentration is greater than the second concentration. The first concentration may be at least 10 percent greater than the second concentration, may be 10 percent to 50 percent greater than the second concentration, or may be 20 percent to 40 percent greater than the second concentration. Optionally, a first average distance between stitches in the first region may be greater than a second average distance between stitches in the second region. Here, the first average distance between stitches may be at least 10 percent greater than the second average distance between stitches, may be 10 percent to 50 percent greater than the second average distance between stitches, or may be 20 percent to 40 percent greater than the second average distance between stitches In some configurations, the second concentration is greater than the first concentration. The second concentration may be at least 10 percent greater than the first concentration, 10 percent to 50 percent greater than the first concentration, or 20 percent to 40 percent greater than the first concentration. Additionally or alternatively, a second average distance between stitches in the first region may be greater than a first average distance between stitches in the second region. Here, the second average distance between stitches may be at least 10 percent greater than the first average distance between stitches, 10 percent to 50 percent greater than the first average distance between stitches, or 20 percent to 40 percent greater than the first average distance between stitches.

In some implementations, the substrate is a textile including fibers and/or yarns formed of a first polymeric composition including one or more first polymers. The stitching thread may include a second polymeric composition including one or more second polymers. The substrate may be a textile including a first polymeric composition including one or more first polymers where at least one of the one or more first polymers of the first polymeric composition of the substrate is the same as at least one of the one or more second polymers of the second polymeric composition of the stitching thread. Here, the textile may be a non-woven textile. In some examples, the bundle of fibers includes at least one of carbon fibers, boron fibers, glass fibers, and synthetic polymer fibers. The synthetic polymer fibers may be high tenacity synthetic polymer fibers such as aramid fibers.

In some configurations, the stitched article includes a second strand portion formed from a second bundle of fibers, attached to the substrate in the first region and in the second region via a series of stitches formed with a second thread. The first bundle of fibers may include carbon fibers. The second bundle of fibers may include glass fibers. A concentration of the first bundle of fibers in the first region may be at least 5 weight percent greater than a concentration of the first bundle of fibers in the second region. Additionally or alternatively, a concentration of the second bundle of fibers in the second region may be at least 5 weight percent greater than a concentration of the second bundle of fibers in the first region. Here, a melting temperature of the second polymeric composition of the thread may be at least 15 degrees C. higher than a melting temperature of the first polymeric composition of the substrate.

In some examples, the series of stitches crosses over the strand portion. Optionally, the second region may define a flex zone having a greater flexibility than the first region. The flexibility of the second region may be at least 5 percent greater than the flexibility of the first region or may be at least 10 percent greater than the flexibility of the first region. The second concentration may be greater than the first concentration.

In some implementations, the stitched article is a component of an article of footwear, an article of apparel, or an article of sporting equipment. The component of the article of footwear may be a component of a plate of an article of footwear.

Another aspect of the disclosure provides a stitched article. The stitched article includes a substrate having a first side and a second side. The stitched article also includes a strand portion formed from a bundle of fibers, attached to the substrate via a series of stitches formed with a thread, forming a first layer on the substrate, and including a first length extending in a direction between the first side and the second side and a second length extending in a direction between the first side and the second side. The stitches have a different concentration along the first length than the second length.

Implementation of this aspect may include one or more of the following optional features. In some configurations, the stitches cross over the strand portion and penetrate the substrate at first attachment locations that are spaced apart from the strand portion. The stitches may also penetrate the strand portion. The substrate may include a first end and a second end, the first length being located closer to the first end than the second length and having a greater concentration of the stitches than the second length. Here, the substrate may include a flex zone at the first length, the flex zone having a greater flexibility than other regions of the substrate.

In some examples, the substrate is a textile including a first polymeric composition that includes one or more first polymers and the thread includes a second polymeric composition that includes one or more second polymers. In this example, at least one of the one or more first polymers is the same type of polymer as at least one of the one or more second polymers. Examples of types of polymers suitable for use as the first and second polymers of the substrate and the stitching thread include polyurethanes, polyethers, polyesters, polyamides, and polyolefins.

In some configurations, the bundle of fibers includes at least one of carbon fibers, boron fibers, glass fibers, and synthetic polymer fibers. The thread forming the stitches may be formed from a polymeric composition. Optionally, the stitching thread may be formed from a polymeric composition including one or more of the same type(s) of polymers as the substrate. Further, a polymeric composition included in the thread may have a higher melting point than the substrate. The series of stitches formed by the stitching thread may also cross over the strand portion.

Yet another aspect of the disclosure provides a stitched article. The stitched article includes a substrate having a first side and a second side. The stitched article includes a strand portion formed from a bundle of fibers, attached to the substrate via a series of stitches formed with a thread, forming a first layer on the substrate, and including a first length extending in a direction between the first side and the second side and a second length extending in a direction between the first side and the second side. A concentration of the stitches varies along at least one of the first length and the second length between the first side and the second side.

This aspect of the disclosure may include one or more of the following optional features. In some examples, the stitches cross over the strand portion and penetrate the substrate at first attachment locations that are spaced apart from the strand portion. The stitches may also penetrate the strand portion.

In some implementations, the substrate includes a first end and a second end, the first length being located closer to the first end than the second length and having a greater concentration of the stitches than the second length. Here, the substrate may include a flex zone at the first length, the flex zone having a greater flexibility than other regions of the substrate. The substrate may be a textile including a first polymeric composition including one or more first polymers and the thread may include a second polymeric composition including one or more second polymers. Here, at least one of the one or more first polymers is the same as at least one of the one or more second polymers.

In some configurations, the bundle of fibers includes at least one of carbon fibers, boron fibers, glass fibers, and synthetic polymer fibers. The thread forming the stitches may be formed from a polymeric composition. Optionally, the stitching thread may be formed from a polymeric composition including one or more of the same type(s) of polymers as the substrate. Further, a polymeric composition included in the thread may have a higher melting point than the substrate. The series of stitches formed by the stitching thread may also cross over the strand portion.

Another aspect of the disclosure provides a stitched article. The stitched article includes a substrate having a first region and a second region. The stitched article also includes a strand portion formed from a bundle of fibers, attached to the substrate via a series of stitches formed with a thread, forming a first layer on the substrate, and including a plurality of lengths having longitudinal axes that extend in a direction between the first region and the second region and distal ends that terminate at respective locations on the substrate that are spaced apart from an edge of the substrate to define a flex zone of the substrate at the distal ends. The flex zone has a greater flexibility than other regions of the substrate.

Implementations of this aspect of the disclosure may include one or more of the following optional features. In some implementations, the distal ends cooperate to form a transition line that extends across a width of the substrate between a first side of the substrate and a second side of the substrate. Here, the transition line is arcuate or the transition line is straight. Optionally, the transition line may extend from the first side to the second side. Additionally or alternatively, the substrate may be exposed between the transition line and the edge.

In some configurations, the substrate is exposed between the distal ends and the edge. The stitches may cross over the strand portion and penetrate the substrate at first attachment locations that are spaced apart from the strand portion. The stitches may also penetrate the strand portion.

In some examples, a concentration of the stitches is different along at least one of the plurality of lengths than the other of the plurality of lengths. In this example, a concentration of the stitches varies along a length of at least one of the lengths of the plurality of lengths. In other examples, a concentration of the stitches varies along a length of at least one of the lengths of the plurality of lengths.

In some implementations, the substrate is a textile including a first polymeric composition comprising one or more first polymers and the thread includes a second polymeric composition comprising one or more second polymers. Here, at least one of the one or more first polymers is the same as at least one of the one or more second polymers.

In some configurations, the bundle of fibers includes at least one of carbon fibers, boron fibers, glass fibers, and synthetic polymer fibers. The thread forming the stitches may be formed from a polymeric composition. Optionally, the stitching thread may be formed from a polymeric composition including one or more of the same type(s) of polymers as the substrate. Further, a polymeric composition included in the thread may have a higher melting point than the substrate. The series of stitches formed by the stitching thread may also cross over the strand portion.

An additional aspect of the disclosure provides a stitched article. The stitched article includes a substrate having a first region and a second region. The stitched article further includes a strand portion formed from a bundle of fibers, attached to the substrate via a series of stitches formed with a thread, forming a first layer on the substrate, and including a flex zone having a greater flexibility than other regions of the substrate. The stitches have a greater concentration along a length of the strand portion within the flex zone than in the other regions of the substrate.

Aspects of this disclosure may include one or more of the following optional features. In some configurations, the flex zone defines a transition line that extends across a width of the substrate between a first side of the substrate and a second side of the substrate. The transition line may be arcuate or the transition line may be straight. Further, the transition line may extend from the first side to the second side. Optionally, the substrate may be exposed between the transition line and an edge of the substrate.

In some examples, the stitches cross over the strand portion and penetrate the substrate at first attachment locations that are spaced apart from the strand portion. Additionally or alternatively, the stitches may penetrate the strand portion. Further, the substrate may be a textile including a first polymeric composition including one or more first polymers and the thread may include a second polymeric composition including one or more second polymers. At least one of the one or more first polymers may be the same as at least one of the one or more second polymers.

In some configurations, the bundle of fibers includes at least one of carbon fibers, boron fibers, glass fibers, and synthetic polymer fibers. The thread forming the stitches may be formed from a polymeric composition. Optionally, the stitching thread may be formed from a polymeric composition including one or more of the same type(s) of polymers as the substrate. Further, a polymeric composition included in the thread may have a higher melting point than the substrate. The series of stitches formed by the stitching thread may also cross over the strand portion.

Another aspect of the disclosure provides a method for forming a stitched article. The method includes positioning a substrate and depositing a strand portion formed from a bundle of fibers on a substrate. The method also includes attaching the strand portion to the substrate via a series of stitches formed with a thread such that a first region of the stitched article has a first concentration of stitches and a second region of the stitched article has a second concentration of stitches, wherein the first concentration of stitches is at least 10 percent greater than the second concentration of stitches. Optionally the stitched article may be a stitched article according to any of the systems or methods disclosed herein.

Another aspect of the disclosure provides a method of forming a composite article. The method includes positioning a stitched article in a mold, the stitched article including strand portions of bundles of fibers stitched to a substrate with a thread. While the stitched article is positioned in the mold, the method further includes consolidating the substrate, the strand portion, and the stitches via a resin composition to form a composite article. The method also includes removing the composite article from the mold. The composite article includes a first region and a second region. The second region includes a flex zone having a greater flexibility than the first region.

Implementations of the disclosure may include one or more of the following optional features. In some implementations, the method includes forming the stitched article prior to positioning the stitched article in the mold. Forming the stitched article may include depositing a strand portion formed from a bundle of fibers on a substrate and attaching the strand portion via a series of stitches formed with a thread to the substrate in a first region having a first concentration of stitches and in a second region having a second region of stitches greater than the first concentration of stitches.

In some examples, consolidating the substrate, the strand portion, and the stitching includes applying the resin composition to the substrate, the strand portion, and the stitching while the stitched article is positioned in the mold. Applying the resin composition may include combining first and second reactive compositions to form a liquid resin composition, and applying the liquid resin composition to the stitched article. The liquid resin composition may be a liquid epoxy resin composition.

In some configurations, the method includes curing the resin composition prior to removing the composite article from the mold. Optionally, the resin composition may be a thermoplastic resin composition contained within at least one of the substrate, the strand portion, and the thread of the stitched article. Consolidating the substrate, the strand portion, and the thread may include causing the resin composition to flow and infiltrate the fibers of the strand portion, followed by allowing the resin composition to re-solidify prior to removing the composite article from the mold. The method may further include trimming a perimeter of the composite article.

In some implementations, the composite article is a component for an article of footwear, apparel, or sporting equipment. When the composite article is a component for an article of footwear, the method further includes incorporating the component for an article of footwear into an article of footwear.

In some configurations, depositing the strand portion on the substrate includes positioning the strand portion in a plurality of lengths having longitudinal axes that extend in a direction between the first region and the second region. The plurality of lengths may have distal ends that terminate at respective locations on the substrate that are spaced apart from an edge of the substrate to define the flex zone. Optionally, depositing the strand portion on the substrate may include positioning the strand portion in a plurality of lengths having a first substantially straight portion within the first region and an arcuate portion within the second region that defines the flex zone. Here, the method may include aligning arcuate portions of adjacent lengths to define the flex zone.

In some examples, attaching the strand portion via a series of stitches formed with a thread includes causing the stitches to cross over the strand portion and penetrate the substrate at first attachment locations that are spaced apart from the strand portion. Additionally or alternatively, attaching the strand portion via a series of stitches formed with a thread includes causing the stitches to penetrate the strand portion.

Yet another aspect of the disclosure provides a method of manufacturing an article of footwear, apparel or sporting equipment. The method includes positioning a composite article. The composite article includes a stitched article having strand portions of bundles of fibers stitched to a substrate with a thread. The fibers are consolidated by a resin composition. The composite article is a component of an article of footwear, apparel, or sporting equipment. The method also includes affixing the composite article and a second component to each other. The second component is a second component of an article of footwear, apparel, or sporting equipment.

Implementations of this aspect of the disclosure may include one or more of the following optional features. In some implementations, the composite article is a component of an article of footwear, and the second component is a second component of an article of footwear. Optionally, the composite article may be a plate for an article of footwear.

Further areas of applicability will become apparent from the description provided herein. The description and specific examples in this summary are intended for purposes of illustration only and are not intended to limit the scope of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1:
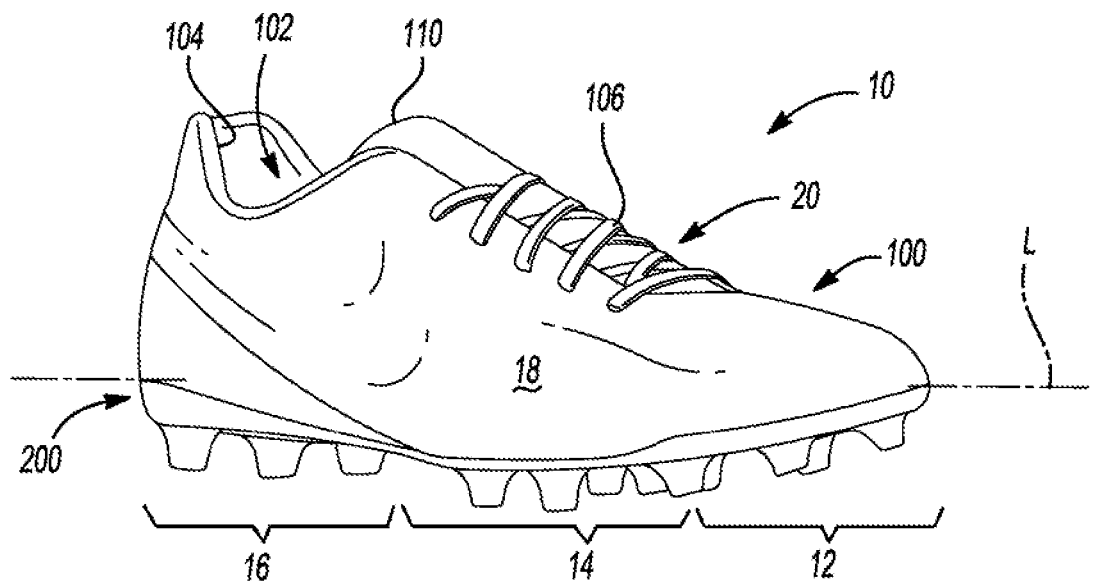
FIG. 1 is a perspective view of an article of footwear in accordance with principles of the present disclosure.

Referring to FIGS. 1-9, in some implementations, an article of footwear 10 includes an upper 100 and a footwear plate 200 attached to the upper 100. FIG. 1 provides a front perspective view of the footwear 10 divided into one or more portions. The portions may include a forefoot portion 12, a mid-foot portion 14, and a heel portion 16. The forefoot, mid-foot, and heel portions 12, 14, 16 may alternatively be referred to as forefoot, mid-foot, and heel regions 12, 14, 16, respectively. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 configured to receive and secure a foot for support on the sole structure 200. Ankle opening 104 located in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

Figure 2:
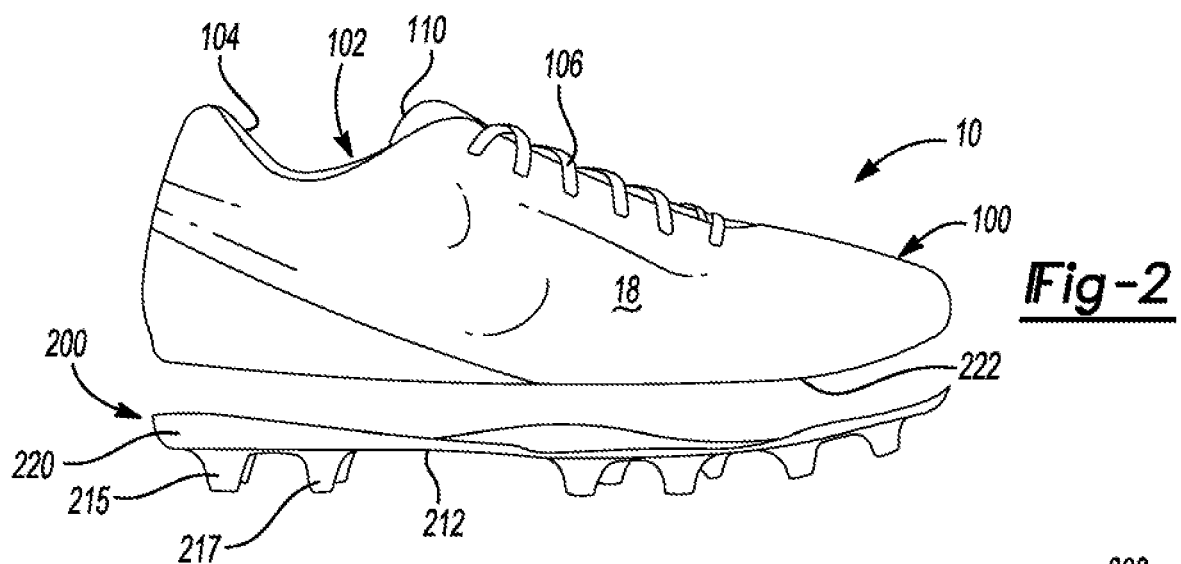
FIG. 2 is an exploded view of the article of footwear of FIG. 1 showing an upper and a substantially rigid, three-dimensional footwear plate including a composite component affixed to a footbed surface of the upper.

Referring to FIG. 2, an exploded view of the article of footwear 10 of FIG. 1 shows a footbed surface 222 disposed between the plate 200 and the upper 100 for receiving a bottom surface (e.g., plantar) of the foot within the interior void 102. The footbed surface 222 may be integrally formed with the upper 100 in some configurations, or the footbed surface 222 may correspond to a separately formed layer that attaches to the upper 100 in other configurations. In some examples, the footbed surface 222 is contoured to conform to a profile of the plantar of the foot. Additionally or alternatively, an insole or sockliner may be disposed upon the footbed surface 222 under the foot within at least a portion of the interior void 102 of the upper 100 to enhance comfort of the footwear 10.

Figure 3:
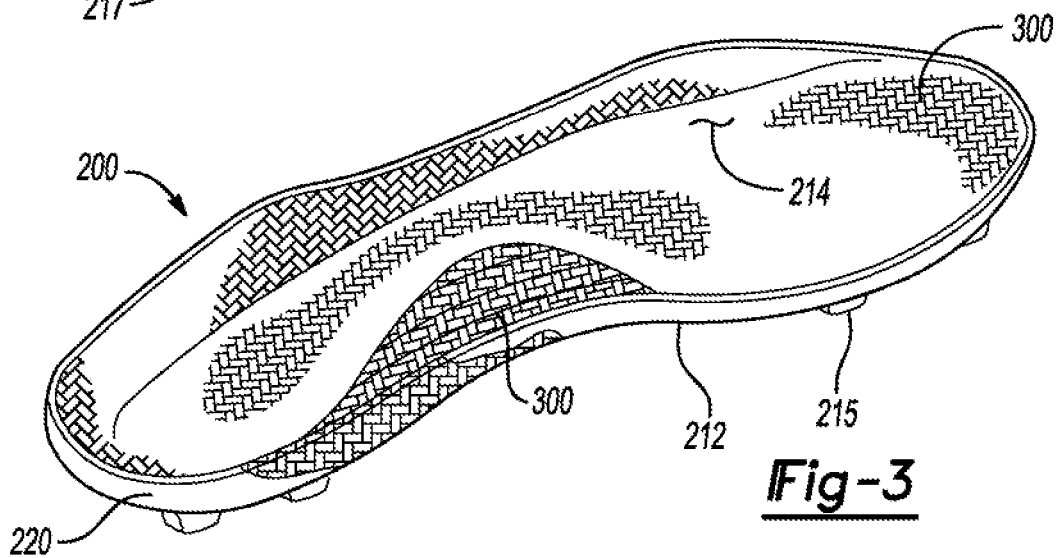
FIG. 3 is a top perspective view of a footwear plate including a composite component of FIG. 1 showing an inner surface of the footwear plate having a shape that conforms to a surface profile of a bottom surface of a foot.

The footwear plate 200 defines a longitudinal axis L that extends through the forefoot portion 12, the mid-foot portion 14, and the heel portion 16. The plate 200 attaches to the upper 100 and may impart features that a conventional outsole provides. FIG. 3 provides a top perspective view of the embroidered plate 200 showing the plate 200 having a ground-engaging surface 212 and an opposite inner surface 214 that opposes the footbed surface 222. In some examples, an outsole material, such as rubber, is attached to the ground-engaging surface 212 to provide traction with the ground surface. The inner surface 214 may be contoured to the shape of the footbed surface 222 to conform to the profile of the bottom surface (e.g., plantar) of the foot within the interior void 102. In some examples, a sidewall 220 extends around a perimeter of the plate 200 between the ground-engaging surface 212 and the inner surface 214. The sidewall 220 and the inner surface 214 of the plate 200 may cooperate to retain and support the foot upon the plate 200 when the interior void 102 receives the foot therein. For instance, the sidewall 220 may define a rim around the perimeter of the contoured inner surface 214 to cradle the foot during use of the footwear 10 when performing walking, running, and/or lateral movements. In some implementations, portions of the sidewall 220 extend around the upper 100 and attach to exterior surfaces of the upper 100 at one or more locations to secure the plate 200 to the upper 100. Adhesives may be used to secure the plate 200 to the upper 100.

In some examples, one or more protruding elements 215 (e.g., cleats) extend from the ground-engaging surface 212 in a direction away from the plate 200 and the upper 100 to provide traction with soft ground surfaces, such as grass. For instance, a cleat shaft 217 associated with each protruding element 215 may attach to the ground-engaging surface 212 of the plate 200 and extend in a direction substantially perpendicular to the longitudinal axis L of the plate 200.

In some implementations, the footwear plate 200 is substantially rigid and formed from one or more composite materials. By contrast to conventional composite plates formed from unidirectional tapes that only afford directional stiffness properties, the footwear plate 200 is formed from one or more strand portions 300 arranged in selected patterns to impart anisotropic stiffness and gradient load paths throughout the plate 200. Each strand portion 300 may refer to a bundle of a plurality of fibers 350, a monofilament, yarn, or polymer pre-impregnated bundles that include ribbon or strips of unidirectional tape. The present disclosure will refer to each strand portion 300 as a corresponding bundle 300 of fibers 350 unless indicated otherwise. As used herein, the term "bundle" refers to a bundle (i.e., plurality) of filaments (e.g., fibers 350) that may be twisted or untwisted and each bundle may be designated a size associated with a number of fibers 350 the corresponding bundle 300 contains. For instance, the at least one bundle 300 forming the footwear plate 200 may range in size from about 1,000 fibers per bundle to about 48,000 fibers per bundle.

In some configurations, the fibers 350 associated with the at least one bundle 300 include at least one of carbon fibers, glass fibers, boron fibers, and/or synthetic polymer fibers. Synthetic polymer fibers may include high tenacity synthetic polymer fibers such as aramid fibers. Additionally, at least a portion of the fibers 350 associated with the at least one bundle 300 may be formed from a first thermoplastic material. Fibers such as carbon fibers, aramid fibers, and boron fibers may provide a high modulus while glass fibers (e.g., fiberglass) and polymer fibers (e.g., nylon or polyester fibers) provide a medium modulus. Additionally or alternatively, fibers or yarns formed of a thermoplastic composition, may be comingled with the fibers 350 of the one or more bundles 300 to assist with melting/infusing the embroidered preform during vacuum molding or compression molding.

In some implementations, a resin composition is used to consolidate the fibers of the strands, forming a composite article. In some examples, in addition to consolidating the fibers to the strands, the resin composition also consolidates the fibers of the substrate, or the fibers of the stitching thread, or the fibers of both the substrate and the stitching thread in the composite article. The resin composition can be applied to the stitched article as a liquid which infiltrates into and around the fibers of the stitched article. The liquid resin composition is then solidified while in contact with the fibers and thus consolidates the fibers in the solid resin composition in the composite article. In one example, the liquid resin composition solidifies into a thermoset resin composition, and the composite article comprises fibers consolidated by the thermoset resin composition. The thermoset resin composition may be formed by combining first and second reactive compositions. Alternatively or additionally, the thermoset resin composition may be formed by exposing the liquid resin composition to actinic radiation (e.g., by exposure to light or heat or both). The liquid resin composition may include one or more epoxy polymer, or one or more precursor to an epoxy polymer. In another example, the liquid resin composition solidifies into a thermoplastic resin composition, and the composite article comprises fibers consolidated by the thermoplastic resin composition. The thermoplastic resin composition may include one or more thermoplastic polyurethane, one or more thermoplastic polyester, one or more thermoplastic polyether, one or more thermoplastic polyamide, one or more thermoplastic polyolefin, or any combination thereof.

In some examples, the density of fiber per unit area varies within a single bundle 300 of fibers 350. Additionally or alternatively, the type of fibers 350 forming a corresponding bundle 300 may vary across the plate 200 between the forefoot region 12 and the heel region 16 and between the lateral side 18 and the medial side 20. In doing so, the plate 200 can be designed to have a stiffness gradient based on anatomical features of the foot so that the plate 200 flexes in a way that matches the natural flex of the foot during walking, running, or other athletic movements. For instance, a stiffness of the plate 200 may increase along the length of the plate 200 from the forefoot portion 12 to the heel portion 14 and/or a stiffness of the plate 200 may be reduced to define a flex zone, such as where toes and joints connect metatarsal bones with phalanx bones of a foot, to allow the plate 200 to bend/flex while mitigating crack propagation at the flex zone. In some examples, the patterns for each bundle 300 of fibers 350 provides a stiffness gradient between the lateral side 18 and the medial side 20 of the plate 200 through at least one of the portions 12, 14, 16. Thus, the one or more bundles 300 of fibers 350 may include paths with multiple curves to change directions in the load path of the plate 200 to accommodate anatomical features as well as to enhance performance of the footwear 10 for its intended use. Moreover, to increase inter-laminar fracture toughness at localized regions of the plate 200 such as flex zones, a concentration of stitching 304 (FIGS. 6-9) used to attach the bundles 300 of fibers 350 to a substrate 400 (FIG. 4) can be higher within the flex zones of the plate 200 and/or additional embroidery stitching may be laid over top of already stitched down bundles 300 of fibers 350 proximate to the flex zones. Here, a spacing of the stitching and/or embroidery stitching may be decreased within the flex zones of the plate 200 so that the stitching density (i.e., concentration) is increased to thereby increase the inter-laminar facture toughness in the flex zone where flexing/bending of the plate 200 occurs repeatedly during use of the plate 200. In some implementations, the plate 200 is formed by embroidering at least two bundles 300 of fibers 350 in a layered configuration while being affixed via stitching to a same substrate 400 (FIGS. 13-15). In other implementations, the plate is formed by affixing at least two bundles 300 of fibers 350 separately to corresponding substrates and stacking the substrates such that the at least two bundles 300 of fibers 350 are embroidered in a layered configuration.

As used herein, the substrate 400 refers to any one of a veil, carrier, or backer at which the at least one bundle 300 of fibers 350 affixes to and binds with. The substrate 400 may be formed from a thermoset polymeric material or a thermoplastic polymeric material and can be a textile (e.g., knit, woven, or non-woven), an injection molded article, or a thermoformed article. The polymeric material of the substrate can include one or more polyurethane, one or more polyether, one or more polyester, one or more polyamide, one or more polyolefin, and combinations thereof. For example, the polyurethane can be a polyester-polyurethane copolymer. The polyester can be a polyethylene terephthalate or a polybutylene terephtalate. The polyamide can be Nylon 6, Nylon 66, or Nylon 11.

The stitching 304 used to attach bundles 300 of fibers 350 to the substrate 400 may be formed from the same material as the substrate 400. For instance, the stitching 304 may include a thread formed from a polymeric composition that includes some of the same polymers as the polymeric composition of the substrate 400. The polymeric material of the stitching can include one or more polyurethane, one or more polyether, one or more polyester, one or more polyamide, one or more polyolefin, and combinations thereof. For example, the polyurethane can be a polyester-polyurethane copolymer. The polyester can be a polyethylene terephtalate or a polybutylene terephtalate. The polyamide can be Nylon 6, Nylon 66, or Nylon 11.

In some examples, the substrate 400 (e.g., a textile) may comprise a first polymeric composition having one or more first polymers, and the thread of the stitching may comprise a second polymeric composition having one or more second polymers with at least one of the one or more second polymers being the same type of polymer as at least one of the one or more first polymers. For example, both the first polymeric composition and the second polymeric may comprise a polyurethane, or both the first polymeric composition and the second polymeric may comprise a polyester, or both the first polymeric composition and the second polymeric may comprise a polyamide, etc. Additionally or alternatively, the thread of the stitching may include a second polymeric composition having a higher melting temperature than the first polymeric composition of the substrate. More specifically, a thermoplastic composition present in or forming a majority of the weight of the thread of the stitching may have a melting temperature which is at least 20-degrees Celsius higher than the melting temperature of a polymeric composition present in the substrate 400. For instance, the thread of the stitching may include a polymeric composition having a melting temperature that is at least 20-degrees Celsius higher than a first polymeric composition included in the substrate 400, or of a first polymeric composition which forms a majority of the weight of the substrate 400.

Generally, it is difficult to manufacture a non-flat (e.g., curved/contoured) and substantially rigid composite plate in its final state from a preform plate that is initially rigid and flat in shape. Implementations herein are directed toward an embroidered preform that affixes the one or more bundles 300 of fibers 350 to the same substrate 400 or different substrates 400, reducing a concentration of the bundles 300 of fibers 350 and/or curving paths of the bundles of fibers 350 in localized areas associated with flex zones, increasing a concentration/density of stitching used to affix the bundles of fibers 350 to the substrate(s) 400 in the localized areas to increase inter-laminar fracture toughness, and applying heat to mold the embroidered preform to form the footwear plate 200 with a desired shape and curvature. Thereafter, the plate 200 may be cured to impart structural rigidity. That is to say, both the substrate(s) 400 and each bundle 300 of fibers 350 are thin and flexible to allow the embroidered preform to be positioned into a mold to form the plate 200 with a three-dimensional shape having structural rigidity. In some examples, manufacturing the plate 200 includes infusing liquid thermoplastic material into the embroidered preform (e.g., one or more bundles 300 of fibers 350 affixed to the substrate 400) and using vacuum molding and/or compression molding techniques to form the plate 200. The liquid thermoplastic material may include at least one of polymerizable compositions or pre-polymer materials. Additional polymers/toughening agents (such as softer polymers, rubber, and/or block copolymers) may be added to the liquid thermoplastic material to reduce brittleness of the plate 200.

In other examples, the substrate 400, or a portion thereof, is formed from a thermoset polymeric material and/or a thermoplastic polymeric material. The thermoplastic polymeric material includes a melting point below a melting point or degradation temperature of the fibers 350 of the bundles 300. Here, incorporating the thermoplastic material and/or the thermoset polymeric material into the substrate 400 may be used in addition to, or in lieu of, the liquid thermoplastic material infused into the embroidered preform to melt/infuse the embroidered preform during the vacuum molding process and/or the compression molding process. Additionally or alternatively, thermoplastic yarns may be comingled with the fibers 350 of the one or more bundles 300 to assist with melting/infusing the embroidered preform during vacuum molding or compression molding. Optionally, the embroidered preform may be powder coated with the thermoset and/or thermoplastic polymeric materials or injection-molding techniques may be used to overmold and/or impregnate the embroidered preform with the thermoset and/or thermoplastic polymeric materials.

FIG. 4 provides a top view of an example substrate 400 used for forming the footwear plate 200. The substrate 400 may be substantially thin, flat, and flexible. As set forth above, the substrate 400, or at least a portion thereof, may be formed from a thermoset polymeric material or a thermoplastic polymeric material. In some configurations, the substrate 400 includes a textile that may be knit, woven, or non-woven. The substrate 400 may also optionally be formed form an injection molded article or a thermoformed article. The substrate 400 may be cut to a desired shape defined by a perimeter edge 402.

FIGS. 5A and 5B each provide a top view of a bundle 300 of fibers 350 attached to a top surface 410 of the substrate 400 of FIG. 4 to form a first layer on the substrate 400. The bundle 300 (i.e., strand portion) includes a plurality of segments 302 that extend continuously between two different locations along the perimeter edge 402 of the substrate 400 to form the first layer covering the substrate 400 (i.e., the segments 302 extend across the substrate 400 between the lateral and medial sides 18, 20). The segments 302 may be disposed adjacent and substantially parallel to one another. In the examples shown, the segments 302 extend in a direction that converges with the longitudinal axis of the substrate 400. In other examples, the segments 302 may extend substantially parallel with the longitudinal axis of the substrate 400 or extend in other directions convergent with the longitudinal axis of the substrate 400. FIG. 5A shows each segment terminating at a corresponding looped portion inside the perimeter edge 402 of the substrate 400. FIG. 5B shows each segment also terminating at a corresponding looped portion, but outside the perimeter edge 402 of the substrate 400. Thus, the looped portions of the segments 302 of FIG. 5B that extend outside the perimeter edge 402 of the substrate 400 may be removed (e.g., by cutting) to eliminate a presence of pinch points during the manufacturing process when the bundle 300 and fibers 300 and the substrate 400 are subjected to heat and pressure.

The bundle of fibers 350 may be attached to the substrate 400 via a series of stitches 304. Referring to FIGS. 6A-8, close-up views in the heel region 16 (FIG. 6A), the midfoot region 14 (FIG. 7), and the forefoot region 12 (FIG. 8) each show a corresponding length/portion of the bundle 300 of fibers 350 attached to the substrate 400 via stitching 304. The bundle 300 is disposed upon the top surface 410 of the substrate 400 and the stitching 304 crosses (e.g., zigzags) over the bundle 300 and penetrates the substrate 400 at attachment locations 305 that are spaced apart from the bundle 300. Additionally or alternatively, portions of the stitching 304 may extend through the bundle 300 of fibers 350. The substrate 400 and the stitching 304 may be formed from thermoplastic polymer materials that melt during thermal processing. The stitching 304 may be formed from a first thermoplastic polymer material and the substrate 400 may be formed from a second thermoplastic polymer material having a lower melting temperature than the first thermoplastic polymer material. Thus, the stitching 304 may retain the bundle 300 of fibers 350 in place without melting when the substrate 400 begins to melt during the thermal processing. In some examples, the stitching 304, or at least a portion thereof, is formed from resin. The stitching 304 may also include materials that match optional infused polymers used for compression molding and/or vacuum molding. The fibers 350 associated with the bundle 300 may include non-polymer fibers 352 and polymer fibers 354. For instance, the non-polymer fibers 352 may include carbon fibers, glass fibers, and/or boron fibers. Synthetic polymer fibers may include high tenacity synthetic polymer fibers such as aramid fibers. The polymer fibers 354, on the other hand, may include thermoplastic polymer fibers having a higher melting temperature than that of the thermoplastic polymer materials used to form the substrate 400 and/or the stitching 304. Moreover, the thermoplastic polymer materials used to form the substrate 400 may include a melting temperature that is below a degradation temperature associated with the non-polymer fibers 352 (e.g., carbon fibers).

The concentration of the stitching 304 may be greater in some localized regions of the plate 200 (or other stitched article) for increasing inter-laminar fracture toughness, while other regions not in need of increased fracture toughness can include a lower concentration of stitching 304 that is suitable for attaching the bundle 300 of fibers 350 to the substrate 400. Moreover, the regions associated with the lower concentration of stitching 304 decrease manufacturing times when attaching the bundle 300 of fibers 350 to the substrate 400. In some examples, the localized regions benefitting from an increased fracture toughness include flex zones where flexing/bending of the formed plate 200 (or other article) occurs repeatedly during use of the plate 200. In some examples, the midfoot region 14 includes a higher concentration of stitching 304 than the heel region 16 and the forefoot region 12 includes a higher concentration of stitching 304 than the midfoot region 14. In some implementations, higher concentrations of stitching 304 may be provided by applying the stitching 304 to the substrate 400 as embroidery without crossing over the bundle 300 such that the density of stitching 304 is increased to increase the inter-laminar fracture toughness in localized regions.

Referring to FIG. 6A, the bundle 300 of fibers 350 is attached to the substrate 400 in the heel region 16 via a first series of stitches 304 formed with the thread and having a first concentration along a first length of the bundle 300 of fibers 350. The first length of the bundle 300 may correspond to one of the segments 302 in the heel region 16 extending in a direction (i.e., convergent to the longitudinal axis L of the substrate 400) between the lateral side 18 of the substrate 400 and the medial side 20 of the substrate 400. In the example shown, the first concentration/density of the stitches 304 is proportional to a first length $L_1$ separating adjacent attachment locations 305 disposed on a same side of the bundle 300. For instance, the stitching 304 may cross over the bundle 300 from a first attachment location 305-1 on one side of the bundle 300 to a second attachment 305-2 on the other side of the bundle, and then back again to the other side of the bundle 300 by crossing over the bundle 300 from the second attachment location 305-2 to a third attachment location 305-3. Here, the first length $L_1$ separates the adjacent first and third attachment locations 305-1 and 305-3 disposed on the same side of the bundle 300.

FIG. 6B provides a cross-sectional view taken along line 6B-6B of FIG. 6A showing the stitching 304 attaching the bundle 300 of fibers 350 to the top surface 410 of the substrate 400. The stitching 304 may penetrate through the surfaces 410, 412 of the substrate 400 and zigzag across the bundle 300 between the first attachment locations 305. The non-polymer fibers 352 (e.g., carbon fibers) and the polymer fibers 354 (e.g., thermoplastic polymer fibers) may include circular cross sections that co-mingle with each other throughout the length of the bundle 300.

Referring to FIG. 7, the bundle 300 of fibers 350 is attached to the substrate 400 in the midfoot region 14 via a second series of stitches 304 formed with the thread and having a second concentration along a second length of the bundle 300 of fibers 350. Here, the second concentration/density of stitches 304 along the second length of the bundle 300 in the midfoot region 14 is greater than the first concentration/density of stitches 304 along the first length of the bundle 300 in the heel region 16 of FIG. 6A. The thread forming the first and second series of stitches 304 may be continuous or discontinuous. The second length of the bundle 300 may correspond to one of the segments 302 in the midfoot region 14 extending in a direction (i.e., convergent to the longitudinal axis L of the substrate 400) between the lateral side 18 of the substrate 400 and the medial side 20 of the substrate 400. As with the first concentration/density of stitching 304 in the heel region 16 along the first length, the second concentration/density of stitching 304 in the midfoot region 14 along the second length of the bundle 300 may be proportional to a second length $L_2$ separating adjacent attachment locations 305 disposed on a same side of the bundle 300. In the example shown, the second length $L_2$ separating the adjacent attachment locations 305 associated with the second length of the bundle 300 is shorter than the first length $L_1$ separating the adjacent attachment locations 305 associated with the first length of the bundle 300. Accordingly, the stitched article (e.g., bundle 300 and substrate 400) includes a higher concentration/density of stitches 304 in the midfoot region 14 along the second length of the bundle 300 than in the heel region 16 along the first length of the bundle 300.

In some implementations, the second concentration is at least 10-percent (10%) greater than the first concentration. In some examples, the second concentration is 10-percent (10%) to 50-percent (50%) greater than the first concentration. The second concentration may be 20-percent (20%) to 40-percent (40%) greater than the first concentration. While the examples show the second concentration of stitches 304 in the midfoot region 14 being greater than the first concentration of stitches 304 in the heel region 16, the first concentration of stitches in the heel region 16 may be greater than the second concentration of stitches 304 in the midfoot region 14 in other examples.

The stitching 304 in the heel region 16 along the first length of the bundle 300 may include a first average distance between adjacent stitches and the stitching 304 in the midfoot region 14 along the second length of the bundle 300 may include a second average distance between adjacent stitches. In some examples, the second average distance between stitches in the midfoot region 14 is greater than the first average distance between stitches in the heel region 16. For instance, the second average distance between stitches 304 may be at least 10-percent (10%) greater than the first average distance. In some configurations, the second average distance is 10-percent (10%) to 50-percent (50%) greater than the first average distance. In other configurations, the second average distance is 20-percent (20%) to 40-percent (40%) greater than the first average distance.

Referring to FIG. 8, the bundle 300 of fibers 350 is attached to the substrate 400 in the forefoot region 12 via a third series of stitches 304 formed with the thread and having a third concentration along a third length of the bundle 300 of fibers 350. Here, the third concentration/density of stitches 304 along the third length of the bundle 300 in the forefoot region 12 is greater than the second concentration/density of stitches 304 along the second length of the bundle 300 in the midfoot region 14 of FIG. 7 (and also the first concentration/density of stitches 304 along the first length of the bundle 300 in the heel region 16 of FIG. 6A). The thread forming the third series of stitches 304 may be continuous or discontinuous with the threads forming the first and/or the second series of stitches 304. The third length of the bundle 300 may correspond to one of the segments 302 in the forefoot region 12 extending in a direction (i.e., convergent to the longitudinal axis L of the substrate 400) between the lateral side 18 of the substrate 400 and the medial side 20 of the substrate 400. In the example shown, the third concentration/density of stitching 304 in the forefoot region 12 along the third length of the bundle 300 is proportional to a third length $L_3$ separating adjacent attachment locations 305 disposed on a same side of the bundle 300. Here, the third length $L_3$ separating the adjacent attachment locations 305 associated with the third length of the bundle 300 is shorter than both the second length $L_2$ separating the adjacent attachment locations 305 of FIG. 7 and the first length $L_1$ separating the adjacent attachment locations of FIG. 6A. Accordingly, the stitched article (e.g., bundle 300 and substrate 400) includes a higher concentration/density of stitches in the forefoot region 12 along the third length of the bundle 300 than in both the midfoot region 14 along the second length of the bundle 300 and in the heel region 16 along the first length of the bundle 300. The concentration/density of stitching 304 may also be increased by incorporating embroidery stitching that secures and penetrates the substrate 400 but does not cross over, or otherwise function, to attach/secure the bundle 300 of fibers 350 to the substrate 400. The use of embroidery stitching merely increases the concentration/density of stitching 304 in localized regions where increasing the inter-laminar fracture toughness is desirable, such as along flex zones of the finished article (e.g., the footwear plate 200).

In some implementations, the third concentration is at least 10-percent (10%) greater than the second concentration. In some examples, the third concentration is 10-percent (10%) to 50-percent (50%) greater than the second concentration. The third concentration may be 20-percent (20%) to 40-percent (40%) greater than the second concentration. While the examples show the third concentration of stitches 304 in the forefoot region 12 being greater than the second concentration of stitches 304 in the midfoot region 14, the second concentration of stitches in the midfoot region 14 may be greater than the third concentration of stitches 304 in the forefoot region 12 in other examples.

The stitching 304 in the midfoot region 14 along the second length of the bundle 300 may include the second average distance between adjacent stitches and the stitching 304 in the forefoot region 12 along the third length of the bundle 300 may include a third average distance between adjacent stitches. In some examples, the third average distance between stitches in the forefoot region 12 is greater than the second average distance between stitches in the midfoot region 14. For instance, the third average distance between stitches 304 may be at least 10-percent (10%) greater than the second average distance. In some configurations, the third average distance is 10-percent (10%) to 50-percent (50%) greater than the second average distance. In other configurations, the third average distance is 20-percent (20%) to 40-percent (40%) greater than the second average distance.

While the examples of FIGS. 6A-8 describe the concentration/density of stitching 304 across lengths of the bundle 300 increasing from the heel region 16 to the forefoot region 12, other examples can include the concentration/density of the stitching 304 across lengths of the bundle 300 increasing from the forefoot region 12 to the heel region 16 without departing from the scope of the present disclosure. Moreover, the concentration/density of stitching 304 across length (s) of one or more bundles 300 in the midfoot region 14 may be higher or lower than the concentration/density of stitching 304 in the forefoot and heel region 12 and 16. Accordingly, any length/portion/segment of the bundle 300 extending along the substrate 400 can be selected to incorporate any concentration/density of stitching 304 to achieve desirable strength and toughness properties in localized regions of the finished article (e.g., plate 200). For example, a higher concentration/density of stitching 304 may be utilized in localized areas associated with flex zones of a footwear plate 200 to mitigate crack propagation due to repeated bending/flexing. Additionally, while the attachment locations 305 are shown as being spaced apart from the bundle 300 such that the stitching 304 crosses over the bundle 300, other examples may include the stitching 304 penetrating through the bundle 300 along the length at one or more locations, In some implementations, a stitched article (i.e., the bundle 300 and substrate 400) includes a concentration of stitches 304 that varies along a length of the bundle of the fibers in a localized region. Referring to FIG. 9, a close-up view shows a corresponding length/portion of the bundle 300 of fibers 350 attached to the substrate 400 via stitching 304 such that a concentration/density of the stitches 304 varies along the length of the bundle 300. For instance, the length of the bundle 300 may correspond to one of the segments 302 extending in the direction from the lateral side 18 of the substrate 400 to the medial side 20 of the substrate 400 and the concentration/density of the stitches 304 increases along the length of the bundle 300 from the medial side 20 to the medial side 18.

FIG. 9 shows the stitches 304 crossing over the bundle 300 of fibers 350 and penetrating the substrate 400 at attachment locations 305-1, 305-2, 305-3, 305-4, 305-5, 305-6, 305-7, 305-8, 305-9, 305-10, 305-11, 305-12, 305-13, 305-14 with each successive attachment location disposed on an opposite side of the bundle 300 in an alternating repeating fashion. In some implementations, the concentration/density of the stitches 304 is proportional to lengths $L_1$, $L_2$, $L_3$ separating adjacent attachment locations disposed on a same side of the substrate 400. In the sample shown, the lengths separating adjacent attachment locations 305 disposed on a same side of the substrate 400 decreases along the length of the bundle 300 from medial side 20 to the lateral side 18. For instance, a first length $L_1$ separating the adjacent attachment locations 305-2 and 305-4 is associated with a first concentration/density of stitching 304 proximate to the medial side 20 of the substrate 400, a second length $L_2$ separating the adjacent attachment locations 305-6 and 305-8 is associated with a second concentration/density of stitching 304 within interior regions of the substrate 400, and a third length $L_3$ separating adjacent segments 305-10 and 305-12 is associated with a third concentration/density of stitching 304 proximate to the lateral side 18. Here, the second concentration/density of stitching 304 associated with the second length $L_2$ is greater than the first concentration/density of stitching 304 associated with the longer first length $L_1$ but less than the third concentration/density of stitching 304 associated with the shorter third length $L_3$. While the example shows the varying concentration/density of stitching 304 increasing in the direction from the medial side 20 of the substrate 400 to the lateral side 18 of the substrate 400, the concentration/density of stitching 304 may increase in the opposite direction from the lateral side 18 of the substrate 400 to the medial side 20 of the substrate 400 without departing from the scope of the present disclosure. Moreover, the concentration/density of stitching 304 may also fluctuate between increasing and decreasing a number of times along any given length of the bundle 300 of fibers 350 including having the greatest concentration/density at a middle portion of the substrate 400 between the lateral side 18 and the medial side 20.

FIG. 10 provides a top view a strand/bundle 300a of fibers 350 that may form a layer 1000 of the footwear plate 200. The pattern of the bundle 300a of fibers 350 is shown relative to a peripheral edge P of the finished footwear plate 200. In some examples, the bundle 300a of fibers 350 is affixed/attached to a base layer that includes a corresponding substrate 400 to form a first layer 1000 on the substrate 400. In other examples, the bundle 300a is affixed/attached on top of a base layer that includes an underlying sheet (e.g., unidirectional tape) or a layer of stand/bundle of fibers all affixed/attached to a single substrate 400 in a layered configuration. In some configurations, the bundle 300a is formed from a corresponding continuous strand of fibers 350. In other configurations, however, the bundle 300a is formed from two or more strands of fibers 350. The bundle 300a may range in size from about 1,000 fibers per bundle to about 48,000 fibers per bundle. In some examples, the bundle 300a includes 12,000 fibers per bundle. The bundle 300a may be formed from the same or different fiber types as the bundle 300 of FIGS. 1-9. For instance, the bundle 300a may include at least one of carbon fibers, glass fibers, boron fibers, and/or synthetic polymer fibers. Synthetic polymer fibers may include high tenacity synthetic polymer fibers such as aramid fibers. The fibers 350 may be comingled with a thermoset polymer material and/or a thermoplastic polymer material to assist with affixing the bundle 300a to the substrate 400 and/or any other layers/sheets of fibers lying underneath or over top of the bundle 300a to form the plate 200 (or other article).

The substrate 400 defines a length extending along a longitudinal axis L from a first end 201 to a second end 202 and a width extending between a first side 18 (e.g., lateral side) and a second side 20 (e.g., medial side). When the stitched article is associated with a footwear plate 200, the first end 201 corresponds to a toe end of the plate 200 and the second end 202 corresponds to a heel end of the plate 200. In the example shown, a series of stitches 304 formed from a thread attach the strand portion formed from the bundle 300a of fibers 300 to the substrate 400. The stitches 304 may cross over the toe 300a and penetrate the substrate 400 at attachment locations that are spaced apart from the strand/toe 300a as described above with reference to FIGS. 6-9. The stitches 304 may also penetrate the toe 300a of fibers 350 at one or more locations. In some examples, the substrate 400 is a textile including a first polymeric composition that includes one or more first polymers and the thread associated with the stitching 304 includes a second polymeric composition that includes one or more second polymers. In this example, at least one of the one or more first polymers is the same as at least one of the one or more second polymers. Optionally, a material (e.g., second polymeric material) forming the thread of stitching 304 may have a higher melting point than the material (e.g., first polymeric material) forming the substrate 400 so that the stitching 304 holds the toe 300a in place when the substrate 400 begins to melt during a thermoforming process. In some examples, the stitching 304, or at least a portion thereof, is formed from resin. In some examples, a melting temperature of the second polymeric composition of the thread is at least 15-degrees Celsius (15° C.) higher than a melting temperature of the first polymeric composition of the substrate.

FIG. 10 shows the strand portion formed from the toe 300a of fibers 350 including looped portions 315 for connecting adjacent segments/courses of the bundle 300a. Some of the looped portions 315 extending outside the peripheral edge P may be removed by cutting along the peripheral edge P to remove the presence of pinch points that may occur when applying pressure for consolidating the fibers 350 to form the footwear plate 200. The looped portions 315 further define distal ends for the adjacent segments/courses of the bundle 300a that terminate at respective locations on the substrate 400 that are spaced apart from the peripheral edge P at the first end 201 to define a flex zone 450 of the substrate 400 at the distal ends. The flex zone 450 includes a greater flexibility than other regions of the substrate 400 and, thus, is configured to provide a greater flexibility to the finished footwear plate 200 at a region where a wearer's foot naturally bends/flexes during walking/running or other movements. The flex zone 450 may include a flexibility at least 5-percent (5%) greater than the flexibility of the other regions. In other examples, the flexibility of the flex zone 450 is at least 10-percent (10%) greater than the flexibility of the other regions. Here, the concentration of fibers 350 is reduced by removing the presence of fibers 350 at the flex zone 450 to accommodate anatomical features as well as to enhance performance of the footwear 10 for its intended use. In the example shown, the distal ends in the flex zone 450 cooperate to define a transition line 1010 that extends from the medial side 20 to the lateral side 18 of the substrate 400. While the transition line 1010 of FIG. 10 is arcuate, the distal ends of the bundle 300a may be modified to form a transition line that is straight. The substrate 400 is exposed between the transition line 1010 and the peripheral edge P at the first end 201 of the substrate 400.

In some implementations, the toe 300a includes a first length 310 and a second length 312 each extending in a direction between the first side 18 and the second side 20 (i.e., the toe 300a is disposed at a non-zero angle (excluding 180 degrees) relative to the longitudinal axis L of the substrate 400 such that the direction of the lengths 310, 312 is convergent with the longitudinal axis L). In other configurations, the direction may extend parallel to the longitudinal axis L without departing from the scope of the present disclosure.

In the example shown, the first length 310 and the second length 320 are associated with a same length of the toe 300a, with the bundle including a plurality of lengths/segments each extending parallel to one another between the heel region 16 and the forefoot region 12. The concentration of stitches 304 may be different along at least one of these plurality of lengths/segments than the other of the plurality of lengths/segments. Along at least one of the plurality of lengths/segments, the first length 310 is disposed closer to the first end 201 of the substrate 400 than the second end 202 of the substrate 400. For example, the first length 310 may be disposed within the flex zone 450 of the substrate 400 and the second length 310 may be disposed outside of the flex zone 450. The stitches 304 in the flex zone 450 of the substrate 400 may include a first concentration along the first length 310 of the bundle 300a and the stitches 304 outside the flex zone may include a second concentration along the second length 310 of the bundle 300a. As the flex zone 450 of the substrate 400 is at the first length 310, the stitches 304 include a higher concentration along the first length 310 than the second length 312 to increase inter-laminar fracture toughness at the flex zone 450 after the finished plate 200 (or other article) is formed. Detailed views along respective portions of the first and second lengths 310, 312 of the bundle 300a each show the stitching 304 following the zigzagging pattern across the bundle 300a and penetrating the substrate 400 at corresponding attachment locations 305. Optionally, the stitching 304 or a portion thereof may include "tacks" configured to attach portions of the bundle 300a to the substrate 400 or simply configured as embroidery to increase inter-laminar fracture toughness in selected regions.

In some implementations, the first concentration is at least 10-percent (10%) greater than the second concentration. In some examples, the first concentration is 10-percent (10%) to 50-percent (50%) greater than the second concentration. The first concentration may be 20-percent (20%) to 40-percent (40%) greater than the second concentration.

FIG. 11 provides a top view a strand/bundle 300b of fibers 350 that may form a layer 1100 of the footwear plate 200. The pattern of the bundle 300a of fibers 350 is shown relative to a peripheral edge P of the finished footwear plate

200. In some examples, the bundle 300*b* of fibers 350 is affixed/attached to a base layer that includes a corresponding substrate 400 to form a first layer 1100 on the substrate 400. In other examples, the bundle 300*b* is affixed/attached on top of a base layer that includes an underlying sheet (e.g., unidirectional tape) or a layer of stand/bundle of fibers all affixed/attached to a single substrate 400 in a layered configuration. As with the bundle 300*a* of fibers 350 of FIG. 10, the bundle 300*b* of fibers 350 may be formed from one continuous strand of fibers 350 or from two or more strands of fibers 350, may range in size from about 1,000 fibers per bundle to about 48,000 fibers per bundle, and may include at least one of carbon fibers, glass fibers, boron fibers, and/or synthetic polymer fibers. Synthetic polymer fibers may include high tenacity synthetic polymer fibers such as aramid fibers. Additionally, the fibers 350 may be comingled with a thermoset polymer material and/or a thermoplastic polymer material to assist with affixing the bundle 300*b* to the substrate 400 and/or any other layers/sheets of fibers lying underneath or over top of the bundle 300*b* to form the plate 200 (or other article).

Implementations include a series of stitches 304 formed from a thread to attach the bundle 300*b* of fibers 300 to the substrate 400 by crossing over the bundle 300*b* and penetrating the substrate 400 at attachment locations spaced apart from the strand/bundle 300*b* and/or penetrating the strand/bundle 300*b*. In some examples, the substrate 400 is a textile including a first polymeric composition that includes one or more first polymers and the thread associated with the stitching 304 includes a second polymeric composition that includes one or more second polymers. In this example, at least one of the one or more first polymers is the same as at least one of the one or more second polymers. Optionally, a material (e.g., second polymeric material) forming the thread of stitching 304 may have a higher melting point than the material (e.g., first polymeric material) forming the substrate 400 so that the stitching 304 holds the bundle 300*b* in place when the substrate 400 begins to melt during a thermoforming process. In some examples, the stitching 304, or at least a portion thereof, is formed from resin. In some examples, a melting temperature of the second polymeric composition of the thread is at least 15-degrees Celsius (15° C.) higher than a melting temperature of the first polymeric composition of the substrate.

FIG. 11 shows the strand portion formed from the bundle 300*b* includes a plurality of lengths (i.e., segments) 320 having longitudinal axes that extend in a direction between the forefoot region 12 (e.g., first region) of the substrate 400 and the heel region 16 (e.g., second region) of the substrate 400. Looped portions 325 may connect adjacent lengths 320. Some of the looped portions 325 extending outside the peripheral edge P may be removed by cutting along the peripheral edge P to remove the presence of pinch points that may occur when applying pressure for consolidating the fibers 350 to form the footwear plate 200 (or other article). Moreover, the substrate 400 includes a flex zone 460 having a greater flexibility than other regions of the substrate 400. More specifically, the plurality of lengths 320 of the bundle 300*b* positioned on the substrate 400 include a first substantially straight portion 321 within the midfoot and heel region 14, 16 and an arcuate portion 322 within the forefoot region 12 that defines the flex zone 460. Thus, the arcuate portions 322 of adjacent lengths 320 of the bundle 300*b* are aligned to define the flex zone 460 with a straight transition line 1110 extending across the width of the substrate 400 between the lateral side 18 (e.g., first side) of the substrate 400 and the medial side 20 (e.g., second side) of the substrate 400. Here, the arcuate portion 322 provides curvature to the path of the bundle 300*b* of fibers 350 to thereby change directions in the load path of the plate 200 to accommodate anatomical features as well as to enhance performance of the footwear 10 for its intended use. Each length 320 of the bundle 300*b* may further include a second substantially straight portion 323 within the forefoot region 12 that extends between the arcuate portion 322 (flex zone 460) and the first end (e.g., toe end) 201 of the substrate 400.

The flex zone 460 includes a greater flexibility than other regions of the substrate 400 and, thus, is configured to provide a greater flexibility to the finished footwear plate 200 at a region where a wearer's foot naturally bends/flexes during walking/running or other movements. The flex zone 460 may include a flexibility at least 5-percent (5%) greater than the flexibility of the other regions. In other examples, the flexibility of the flex zone 460 is at least 10-percent (10%) greater than the flexibility of the other regions.

As with the stitches 304 attaching the bundle 300*a* of FIG. 10, the concentration of stitches 304 may be different along at least one of the plurality of lengths 320 of the bundle 300*b* than the other of the plurality of lengths 320 of the bundle 300*b*. The stitches 304 in the flex zone 460 of the substrate 400 may include a first concentration along the arcuate portion 322 of the bundle 300*b* and the stitches 304 outside the flex zone may include a second concentration along the substantially straight portions 321, 323 of the bundle 300*b*. In the example shown, the stitches 304 along each length 320 include a higher concentration within the flex zone 460 than within other regions to increase the inter-laminar fracture toughness at the flex zone 460 after the finished plate 200 (or other article) is formed. For instance, the density/concentration of the stitching 304 attaching the arcuate portions 322 of the bundle 300*b* to the substrate 400 is greater than the density/concentration of the stitching 304 attaching the first and second substantially straight portions 321, 323 of the bundle 300*b* to the substrate 400. As with the stitches 304 attaching the bundle 300*a* of FIG. 10, the stitching 304 along a portion of any of the lengths 320 and/or arcuate portions 322 of the bundle 300*b* may follow the zigzagging pattern across the bundle 300*b* and penetrating the substrate 400 at corresponding attachment locations 305. Optionally, the stitching 304 or a portion thereof may include "tacks" configured to attach portions of the bundle 300*b* to the substrate 400 or simply configured as embroidery to increase inter-laminar fracture toughness in selected regions.

In some implementations, the first concentration is at least 10-percent (10%) greater than the second concentration. In some examples, the first concentration is 10-percent (10%) to 50-percent (50%) greater than the second concentration. The first concentration may be 20-percent (20%) to 40-percent (40%) greater than the second concentration.

FIG. 12 provides a top view the strand/bundle 300*c* of fibers 350 that may form a layer 1200 of the footwear plate 200. The strand/bundle 300*c* of fibers 350 is substantially identical to the strand/bundle 300*b* of fibers 350 of FIG. 11. In view of the substantial similarity in structure and function of the components associated with the strand/bundle 300*c* of the layer 1200 with respect to the strand/bundle 300*b* of the layer 1100, like reference numerals are used hereinafter and in the drawings to identify like components while like reference numerals containing letter extensions are used to identify those components that have been modified.

As with the strand/bundle 300*b* of fibers 350 forming the layer 1100 of FIG. 11, the strand formed by the bundle 300*c* of fibers 350 includes a plurality of lengths (i.e., segments)

330 having longitudinal axes that extend in a direction between the forefoot region 12 (e.g., first region) of the substrate 400 and the heel region 16 (e.g., second region) of the substrate 400. The lengths 330 of the bundle 300c deposited on the substrate 400 include a first substantially straight portion 331 within the midfoot and heel region 14, 16 and an arcuate portion 332 within the forefoot region 12 that defines a flex zone 470 that is larger than the flex zone 460 defined by the arcuate portions 322 of the bundle 300b of FIG. 11. Thus, the arcuate portions 332 of adjacent lengths 330 of the bundle 300c are aligned to define the flex zone 470 with the straight transition line 1110 extending across the width of the substrate 400 between the lateral side 18 (e.g., first side) of the substrate 400 and the medial side 20 (e.g., second side) of the substrate 400. Here, the arcuate portion 332 provides curvature to the path of the bundle 300c of fibers 350 to thereby change directions in the load path of the plate 200 to accommodate anatomical features as well as to enhance performance of the footwear 10 for its intended use. Each length 330 of the bundle 300c may further include a second substantially straight portion 333 within the forefoot region 12 that extends between the arcuate portion 332 (flex zone 470) and the first end (e.g., toe end) 201 of the substrate 400.

As with the stitches 304 attaching the bundle 300b of FIG. 11, the concentration of stitches 304 may be different along at least one of the plurality of lengths 330 of the bundle 300c than the other of the plurality of lengths 330 of the bundle 300c. The stitches 304 in the flex zone 470 of the substrate 400 may include a first concentration along the arcuate portion 332 of the bundle 300c and the stitches 304 outside the flex zone may include a second concentration along the substantially straight portions 331, 333 of the bundle 300b. In the example shown, the stitches 304 along each length 330 include a higher concentration within the flex zone 470 than within other regions to increase the inter-laminar fracture toughness at the flex zone 470 after the finished plate 200 (or other article) is formed. For instance, the density/concentration of the stitching 304 attaching the arcuate portions 332 of the bundle 300c to the substrate 400 is greater than the density/concentration of the stitching 304 attaching the first and second substantially straight portions 331, 333 of the bundle 300c to the substrate 400. As with the stitches 304 attaching the bundle 300a of FIG. 10 and the bundle 300b of FIG. 11, the stitching 304 along a portion of any of the lengths 330 and/or arcuate portions 332 of the bundle 300c may follow the zigzagging pattern across the bundle 300c and penetrating the substrate 400 at corresponding attachment locations 305. Optionally, the stitching 304 or a portion thereof may include "tacks" configured to attach portions of the bundle 300c to the substrate 400 or simply configured as embroidery to increase inter-laminar fracture toughness in selected regions.

In some implementations, the first concentration is at least 10-percent (10%) greater than the second concentration. In some examples, the first concentration is 10-percent (10%) to 50-percent (50%) greater than the second concentration. The first concentration may be 20-percent (20%) to 40-percent (40%) greater than the second concentration.

Referring to FIG. 13, the layer 1100 formed by the corresponding bundle 300b of fibers 350 may be incorporated into a series of stacked layers 500a-500b of fibers 502 to increase flexibility in one or more localized regions and tune stiffness properties imparted by the finished footwear plate 200. Either or both of the layers 1000, 1200 of FIGS. 10 and 12 could be incorporated into the series of stacked layers 500a-500b of fibers 502 instead of, or in lieu of, the layer 1100 formed by the corresponding bundle 300b of fibers 350. In the example shown, the stacked layers 500a-500b are formed from individual strands 502 of fibers, whereby each strand 502 refers to a plurality of fibers, a monofilament, a yarn, or a polymer pre-impregnated bundles. For instance, the strand 902 may include a plurality of carbon fibers and a plurality of resin fibers that, when activated, solidify and hold the carbon fibers in a desired shape and position relative to one another. As used herein, the term "bundle" refers to a bundle (i.e., plurality of filaments (e.g., fibers 350) that may be twisted or untwisted and each bundle may be designated a size associated with a number of fibers the corresponding bundle contains. For instance, a single strand 502 may range in size from about 1,000 fibers per bundle to about 48,000 fibers per bundle. Each strand 502 may affix to a corresponding substrate 400, or all of the strands 502 may affix to a same substrate 400 representative of a base layer for the footwear plate 200. In other examples, the layers 500a-500b are formed from prepreg fiber sheets that may be unidirectional tape or multi-axial fabric having fibers 502 impregnated with resin. Alternatively, some of the layers 500a-500b may be a unidirectional tape while others of the layers 500a-500b may be a multi-axial fabric. Whether the layers 500a-500b correspond to layers formed by corresponding strands 502 or correspond to sheets of unidirectional tape or multi-axial fabric having the fibers 502, the fibers 502 include at least one of carbon fibers, glass fibers, boron fibers, and/or synthetic polymer fibers. Synthetic polymer fibers may include high tenacity synthetic polymer fibers such as aramid fibers. Fibers such as carbon fibers, aramid fibers, and boron fibers may provide a high Young's modulus while glass fibers (e.g., fiberglass) and medium tenacity polymer fibers (e.g., nylon or polyester fibers) provide a medium modulus. The fiberglass fibers may include E6 318 fibers manufactured by Jushi™. Carbon fibers may include Teryfyl TC35 fibers, Hyosun H2550 fibers or Tenax-E HTS 40 fibers.

In some implementations, the layers 500a-500b include fibers 502 formed at different angles relative to one another such that a longitudinal axis of the fibers 502 (unidirectional tape, multi-axial fabric, strand) is positioned at an angle ($\Phi$) relative to a longitudinal axis (L) of each layer 500a-500b. In one configuration, the fibers 502 of the layer 500a are positioned at the angle ($\Phi$) equal to 60 degrees (60°) relative to the longitudinal axis (L) and the fibers 502 of the layer 500b are positioned at the angle ($\Phi$) equal to 0 degrees (0°) relative to the longitudinal axis (L). Accordingly, when the layers 500a-500b are stacked on one another, the longitudinal axes of the fibers 502 associated with the layers 500a are positioned at different angles relative to the longitudinal axis (L) of the plate 200 while the longitudinal axes of the fibers 502 associated with the layers 500b are positioned parallel to the longitudinal axis (L) of the plate 200. The layer 500a and/or the layer 500b could be positioned at different angles relative to the longitudinal axis (L) in other configurations.

FIG. 13 shows a stacked configuration that includes a total of five (5) layers with a bottom layer 500a including fibers 502 positioned at 60° relative to the longitudinal axis (L), the next layer 500b including fibers 502 positioned at 0° relative to the longitudinal axis (L), a single layer 1100 of the bundle 300b of fibers 350, the next layer 500b including fibers 502 positioned at 0° relative to the longitudinal axis (L), and the top and final layer 500a including fibers 502 positioned at 60° relative to the longitudinal axis (L). In the example shown, the bottom layer 500a is attached to the substrate 400 and the remaining layers 500a, 500b, 1100 also attach to the substrate 400 over top the bottom layer 500a. In other examples, at least two of the layers 500a-500b, 1100 attach to a corresponding substrate 400. Stitching 304 is used to attach layers 500a-500b, 1100 to the substrate 400. The middle layer 1100 of the bundle 300b of fibers 350 provides a localized region of increased flexibility in the forefoot region 12 due to the flex zone 460 formed by the arcuate portions 322 of the bundle 300b, while the stitching 304 attaching the bundle 300b of fibers 350 to the substrate 400 includes a concentration/density that is higher in the flex zone 460 than in other regions to increase the inter-laminar fracture toughness of the plate 200 in the localized region of increased flexibility.

Referring to FIG. 14, in some implementations, one or more of the layers 1100 formed by the corresponding bundle 300b of fibers 350 may be incorporated into a series of stacked layers 600a-600b of fibers 602 to increase flexibility in one or more localized regions and tune stiffness properties imparted by the finished footwear plate 200. Either or both of the layers 1000, 1200 of FIGS. 10 and 12 could be incorporated into the series of stacked layers 600a-600b of fibers 602 instead of, or in lieu of, the layer 1100 formed by the corresponding bundle 300b of fibers 350. As with the stacked layers 500a-500b of FIG. 13, the stacked layers 600a-600b are formed from individual strands 602 of fibers, whereby each strand 602 refers to a plurality of fibers, a monofilament, a yarn, or a polymer pre-impregnated bundles. For instance, the strand 602 may include a plurality of carbon fibers and a plurality of resin fibers that, when activated, solidify and hold the carbon fibers in a desired shape and position relative to one another. As used herein, the term "bundle" refers to a bundle (i.e., plurality of filaments (e.g., fibers 350) that may be twisted or untwisted and each bundle may be designated a size associated with a number of fibers the corresponding bundle contains. For instance, a single strand 602 may range in size from about 1,000 fibers per bundle to about 48,000 fibers per bundle. Each strand 602 may affix to a corresponding substrate 400, or all of the strands 602 may affix to a same substrate 400 representative of a base layer for the footwear plate 200. In other examples, the layers 600a-600b are formed from prepreg fiber sheets that may be unidirectional tape or multi-axial fabric having fibers 602 impregnated with resin. Alternatively, some of the layers 600a-600b may be a unidirectional tape while others of the layers 600a-600b may be a multi-axial fabric. Whether the layers 600a-600b correspond to layers formed by corresponding strands 602 or correspond to sheets of unidirectional tape or multi-axial fabric having the fibers 602, the fibers 602 include at least one of carbon fibers, glass fibers, boron fibers, and/or synthetic polymer fibers. Synthetic polymer fibers may include high tenacity synthetic polymer fibers such as aramid fibers. Fibers such as carbon fibers, aramid fibers, and boron fibers may provide a high Young's modulus while glass fibers (e.g., fiberglass) and medium tenacity polymer fibers (e.g., polyester or nylon fibers) provide a medium modulus. The fiberglass fibers may include E6 318 fibers manufactured by Jushi™. Carbon fibers may include Teryfyl TC35 fibers, Hyosun H2550 fibers or Tenax-E HTS 40 fibers.

In some implementations, the layers 600a-600b include fibers 602 formed at different angles relative to one another such that a longitudinal axis of the fibers 602 (unidirectional tape, multi-axial fabric, strand) is positioned at an angle ($\Phi$) relative to a longitudinal axis (L) of each layer 600a-600b. In one configuration, the fibers 602 of the layer 600a are positioned at the angle ($\Phi$) equal to 60 degrees (60°) relative to the longitudinal axis (L) and the fibers 602 of the layer 600b are positioned at the angle ($\Phi$) equal to 0 degrees (0°) relative to the longitudinal axis (L). Accordingly, when the layers 600a-600b are stacked on one another, the longitudinal axes of the fibers 602 associated with the layers 600a are positioned at different angles relative to the longitudinal axis (L) of the plate 200 while the longitudinal axes of the fibers 602 associated with the layers 600b are positioned parallel to the longitudinal axis (L) of the plate 200. The layer 600a and/or the layer 600b could be positioned at different angles relative to the longitudinal axis (L) in other configurations.

While the stacked configuration of FIG. 13 includes a total of five (5) layers, FIG. 14 shows a stacked configuration that includes a total of four (4) layers with a bottom layer 600a including fibers 602 positioned at 60° relative to the longitudinal axis (L), the next layer 600b including fibers 602 positioned at 0° relative to the longitudinal axis (L), a single layer 1100 of the bundle 300b of fibers 350, and the top and final layer 600a including fibers 602 positioned at 60° relative to the longitudinal axis (L). In the example shown, the bottom layer 600a is attached to the substrate 400 and the remaining layers 600a, 600b, 1100 also attach to the substrate 400 over top the bottom layer 600a. In other examples, at least two of the layers 600a-600b, 1100 attach to a corresponding substrate 400. Stitching 304 is used to attach layers 600a-600b, 1100 to the substrate 400. The middle layer 1100 of the bundle 300b of fibers 350 provides a localized region of increased flexibility in the forefoot region 12 due to the flex zone 460 formed by the arcuate portions 322 of the bundle 300b, while the stitching 304 attaching the bundle 300b of fibers 350 to the substrate 400 includes a concentration/density that is higher in the flex zone 460 than in other regions to increase the inter-laminar fracture toughness of the plate 200 in the localized region of increased flexibility.

Referring to FIG. 15, in some implementations, one or more of the layers 1100 formed by the corresponding bundle 300b of fibers 350 may be incorporated into a series of stacked layers 700a of fibers 702 to increase flexibility in one or more localized regions and tune stiffness properties imparted by the finished footwear plate 200. Either or both of the layers 1000, 1200 of FIGS. 10 and 12 could be incorporated into the series of stacked layers 700a of fibers 702 instead of, or in lieu of, the layers 1100 formed by the corresponding bundle 300b of fibers 350. As with the stacked layers 500a-500b, 600a-600b of FIGS. 13 and 14, the stacked layers 700a are formed from individual strands 702 of fibers, whereby each strand 702 refers to a plurality of fibers, a monofilament, a yarn, or a polymer pre-impregnated bundles. For instance, the strand 702 may include a plurality of carbon fibers and a plurality of resin fibers that, when activated, solidify and hold the carbon fibers in a desired shape and position relative to one another. As used herein, the term "bundle" refers to a bundle (i.e., plurality of filaments (e.g., fibers 350) that may be twisted or untwisted and each bundle may be designated a size associated with a number of fibers the corresponding bundle contains. For instance, a single strand 702 may range in size from about 1,000 fibers per bundle to about 48,000 fibers per bundle. Each strand 702 may affix to a corresponding substrate 400, or all of the strands 702 may affix to a same substrate 400 representative of a base layer for the footwear plate 200. In other examples, the layers 700a are formed from prepreg fiber sheets that may be unidirectional tape or multi-axial fabric having fibers 702 impregnated with resin. Alternatively, some of the layers 700a may be a unidirectional tape while others of the layers 700a may be a multi-axial fabric. Whether the layers 700a correspond to layers formed by corresponding strands 702 or correspond to sheets of unidirectional tape or multi-axial fabric having the fibers 702, the fibers 702 include at least one of carbon fibers, glass fibers, boron fibers, and/or synthetic polymer fibers. Synthetic polymer fibers may include high tenacity synthetic polymer fibers such as aramid fibers. Fibers such as carbon fibers, aramid fibers, and boron fibers may provide a high Young's modulus while glass fibers (e.g., fiberglass) and medium tenacity polymer fibers (e.g., polyester or nylon fibers) provide a medium modulus. The fiberglass fibers may include E6 318 fibers manufactured by Jushi™. Carbon fibers may include Teryfyl TC35 fibers, Hyosun H2550 fibers or Tenax-E HTS 40 fibers.

In some implementations, the layers 700a include fibers 702 formed at different angles relative to one another such that a longitudinal axis of the fibers 702 (unidirectional tape, multi-axial fabric, strand) is positioned at an angle (Φ) relative to a longitudinal axis (L) of each layer 700a. In one configuration, the fibers 702 of the layers 700a are positioned at the angle (Φ) equal to 60 degrees (60°) relative to the longitudinal axis (L). Accordingly, when the layers 700a are stacked on one another, the longitudinal axes of the fibers 702 associated with the layers 700a are positioned at different angles relative to the longitudinal axis (L) of the plate 200. The layer 600a could be positioned at other angles than 60° relative to the longitudinal axis (L) in other configurations.

FIG. 15 shows a stacked configuration that includes a total of four (4) layers with a bottom layer 700a including fibers 702 positioned at 60° relative to the longitudinal axis (L), two (2) layers 1100 of the bundle 300b of fibers 350, and the top and final layer 700a including fibers 702 positioned at 60° relative to the longitudinal axis (L). In the example shown, the bottom layer 700a is attached to the substrate 400 and the remaining layers 700a, 1100 also attach to the substrate 400 over top the bottom layer 700a. In other examples, at least two of the layers 700a, 1100 attach to a corresponding substrate 400. Stitching 304 is used to attach layers 700a, 1100 to the substrate 400. The two middle layers 1100 of the bundle 300b of fibers 350 provide localized regions of increased flexibility in the forefoot region 12 due to the flex zones 460 formed by the arcuate portions 322 of the bundle 300b, while the stitching 304 attaching each bundle 300b of fibers 350 to the substrate 400 includes a concentration/density that is higher in the flex zones 460 than in other regions to increase the inter-laminar fracture toughness of the plate 200 in the localized region of increased flexibility.

While the examples of FIGS. 13-15 are directed toward stacking layers of fibers 702 upon one or more substrates 400 to form a footwear plate, other examples can include stacking layers of fibers upon one or more substrates 400 of different shapes to form other stitched articles that include increased flexibility in one or more localized regions. For example, such other articles formed to have increased flexibility in one or more localized regions can include a concentration/density of stitching 304 that is higher in the localized region(s) to increase the inter-laminar fracture toughness of the finished article in the localized region(s) of increased flexibility.

FIGS. 13-15 depict that a first strand portion formed from a first bundle of fibers may be attached to the substrate in at least first and second regions (e.g., heel and forefoot) via a series of stitches formed with a second thread, and at least a second strand portion formed from a second bundle of fibers may be attached to the substrate in at least the first and second regions via a series of stitches formed with a second thread. The first bundle of fibers may include carbon fibers and the second bundle of fibers may include glass fibers. In some examples, a concentration of the first bundle of fibers in the first region is at least 5-percent (5 percent) greater than a concentration of the first bundle of fibers in the second region. Additionally or alternatively, a concentration of the second bundle of fibers in the second region is at least 5-percent (5 percent) greater than a concentration of the second bundle of fibers in the first region.

With particular reference to FIGS. 16 and 17, formation of a footwear plate 200 is described in conjunction with a mold 800. The mold 800 includes a first mold half 802 and a second mold half 804. The mold halves 802, 804 include a mold cavity 806 having the shape of the footwear plate 200, to allow the mold 800 to impart the desired shape of the particular plate 200 to either the stacked layers 500a-500b of FIG. 13 incorporating one or more of the layers 1000, 1100, 1200 of FIGS. 10-12 formed by the corresponding first bundle 300a, 300b, 300c of fibers 350, the stacked layers 600a-600b of FIG. 14 incorporating one or more of the layers 1000, 1100, 1200 of FIGS. 10-12 formed by the corresponding first bundle 300a, 300b, 300c of fibers 350, or the stacked layers 700a of FIG. 15 incorporating one or more of the layers 1000, 1100, 1200 of FIGS. 10-12 formed by the corresponding first bundle 300a, 300b, 300c of fibers 350.

In some examples, the bundle 300a, 300b, 300c attached to the corresponding substrate 400 via the stitching 304 are consolidated via a resin, such as a liquid resin material applied to the bundle 300a, 300b, 300c, the substrate 400, and the stitching 304. The liquid resin could include a liquid epoxy. The liquid resin may be formed by combining first and second reactive compositions to form the liquid resin. Application of the resin material could flow through the bundle 300a, 300b, 300c, the substrate 400, and the stitching 304 and then cure when subjected to heat and pressure by the mold 800. As discussed above, the stitching 304 may be formed from a thread that may cross over the bundle 300a, 300b, 300c and/or penetrate the bundle 300a, 300b, 300c or other layers of fibers underneath to secure the bundle 300a, 300b, 300c to the substrate. For instance, the thread may be formed from a material having a higher melting point than that of the substrate 400 so that the stitching 304 can hold the bundle 300a, 300b, 300c in place when the substrate 400 begins to melt during the thermoforming process. The thread may be formed from resin and/or formed from the same or different material as the substrate. The substrate 400 may be formed from a textile including a first polymeric composition having one or more first polymers and the thread may be formed from a second polymeric composition including one or more second polymers, whereby at least one of the one or more first polymers are the same as at least one of the one or more second polymers. The textile forming the substrate 400 may be a non-woven textile. In some examples, a melting temperature of the second polymeric composition of the thread is at least 15-degrees Celsius (15° C.) higher than a melting temperature of the first polymeric composition of the substrate.

After forming the stacked sheets/layers 500a-500b, 600a-600b, 700a, the sheets/layers 500a-500b, 600a-600b, 700a are inserted between the mold halves 802, 804 within the mold cavity 806. At this point, the mold 800 is closed by moving the mold halves 802, 804 toward one another or by moving one of the mold halves 802, 804 toward the other mold half 802, 804. Once closed, the mold 800 applies heat and pressure to the stacked sheets/layers 500a-500b, 600a-600b, 700a disposed within the mold cavity 806 to activate the resin associated with the stacked sheets/layers 500a-500b, 600a-600b, 700a. The heat and pressure applied to the stacked sheets/layers 500a-500b, 600a-600b, 700a causes the particular shape of the mold cavity 806 to be applied to the stacked sheets/layers 500a-500b, 600a-600b, 700a and, once cured, the resin associated with the stacked sheets/layers 500a-500b, 600a-600b, 700a cause the stacked sheets/layers 500a-500b, 600a-600b, 700a to harden and retain the desired shape. In some examples, when the resin composition includes the liquid epoxy resin composition, the liquid epoxy resin composition cures prior to removing the composite article from the mold. Moreover, the incorporated layer(s) 1000, 1100, 1200 formed by the corresponding bundles 300a, 300b, 300c of fibers 350 may include thermoplastic yarns and/or stitching 304 formed from thermoplastic or thermoset material to assist with attaching to the stacked layers 500a-500b, 600a-600b, 700a to retain the desired shape.

In some implementations, the resin composition is a thermoplastic resin composition contained within at least one of the substrate, the strand portion 300, 300b, 300c and the thread of the stitching 304. The thermoplastic resin may consolidate the substrate, the strand portion, and the thread of the stitching 304 by flowing and infiltrating the fibers 350 of the strand portion. The thermoplastic resin composition may be allowed to re-solidify prior to removing the composition article from the mold.

It should be noted that while the sheets/layers 500a-500b, 600a-600b, 700a are described as including a resin material, the sheets/layers 500a-500b, 600a-600b, 700a could additionally be supplied with resin that is infused within the mold 800. The infused resin could be in addition to the impregnated resin of the sheets/layers 500a-500b, 600a-600b, 700a or, alternatively, could be used in place of the impregnated resin. The infused resin may include a liquid epoxy, thermoplastic or thermoset material.

The forgoing processes may be used to form footwear plates and cushioning elements that may be used to manufacture custom-made footwear. For instance, various measurements of the foot may be recorded to determine suitable dimensions of the footwear plate and the cushioning member(s) incorporated into the article of footwear. Additionally, data associated with the gate of the foot may be obtained to determine if the foot is indicative of toe striking or heel striking. The foot measurements and obtained data may be used to determine optimal angles and radii of curvature of the footwear plate, as well as the thickness of the one or more cushioning members positioned above, below, or encapsulating the footwear plate. Moreover, the length and width of the footwear plate may be determined based on the collected data and foot measurements. In some examples, the foot measurements and collected data are used to select the footwear plate and/or cushioning member(s) from a plurality of pre-fabricated footwear plates and/or cushioning member(s) of various sizes and dimensions that closely match the foot of the wearer.

Custom footwear plates may further allow for tailoring of the stiffness of the plate for a particular wearer of the footwear. For instance, the tendon stiffness and calf muscle strength of an athlete may be measured to determine a suitable stiffness of the plate for use by the athlete. Here, the stiffness of the footwear plate can vary with the strength of the athlete or for the size/condition of the athlete's tendons. Additionally or alternatively, the stiffness of the plate may be tailored based on biomechanics and running mechanics of a particular athlete, such as how the angles of the athlete's joints change during running movements. In some examples, force and motion measurements of the athlete are obtained before manufacturing a custom plate for the athlete. In other examples, plates are manufactured in particular ranges or increments of stiffness to provide semi-custom footwear such that individual athletes may select a suitable stiffness.

The following Clauses provide an exemplary configuration for a method of forming a plate for an article of footwear described above.

Clause 1: A stitched article comprising: a substrate having a first region and a second region; and a first strand portion formed from a first bundle of fibers, wherein the first bundle of fibers is attached to the substrate in the first region and in the second region via a series of stitches formed with a first thread, the first bundle of fibers form a first layer on the substrate, and the article has a first concentration of the stitches in the first region along a first length of the first strand portion and a second concentration of the stitches different than the first concentration in the second region along a second length of the first strand portion.

Clause 2: The stitched article of Clause 1, wherein the stitches cross over the first strand portion and penetrate the substrate at first attachment locations that are spaced apart from the first strand portion, and cross over the second strand portion and penetrate the substrate at second attachment locations that are spaced apart from the second strand portion.

Clause 3: The stitched article of Clause 1, wherein the stitches penetrate the first strand portion, or the second strand portion, or both.

Clause 4: The stitched article of any of the preceding Clauses, wherein the first length extends in a direction between a medial side of the substrate and a lateral side of the substrate.

Clause 5: The stitched article of Clause 4, wherein the second length extends in a direction between the medial side of the substrate and the lateral side of the substrate.

Clause 6: The stitched article of any of the preceding Clauses, wherein the first concentration is greater than the second concentration.

Clause 7: The stitched article of Clause 6, wherein the first concentration is at least 10 percent greater than the second concentration.

Clause 8: The stitched article of Clause 7, wherein the first concentration is 10 percent to 50 percent greater than the second concentration.

Clause 9: The stitched article of Clause 8, wherein the first concentration is 20 percent to 40 percent greater than the second concentration.

Clause 10: The stitched article of any of the preceding Clauses, wherein a first average distance between stitches in the first region is greater than a second average distance between stitches in the second region.

Clause 11: The stitched article of Clause 10, wherein the first average distance between stitches is at least 10 percent greater than the second average distance between stitches.

Clause 12: The stitched article of Clause 11, wherein the first average distance between stitches is 10 percent to 50 percent greater than the second average distance between stitches.

Clause 13: The stitched article of Clause 12, wherein the first average distance between stitches is 20 percent to 40 percent greater than the second average distance between stitches.

Clause 14: The stitched article of any of Clauses 1-5 or 10-13, wherein the second concentration is greater than the first concentration.

Clause 15: The stitched article of Clause 14, wherein the second concentration is at least 10 percent greater than the first concentration.

Clause 16: The stitched article of Clause 15, wherein the second concentration is 10 percent to 50 percent greater than the first concentration.

Clause 17: The stitched article of Clause 16, wherein the second concentration is 20 percent to 40 percent greater than the first concentration.

Clause 18: The stitched article of any of Clauses 1-9 or 14-17, wherein a second average distance between stitches in the first region is greater than a first average distance between stitches in the second region.

Clause 19: The stitched article of Clause 18, wherein the second average distance between stitches is at least 10 percent greater than the first average distance between stitches.

Clause 20: The stitched article of Clause 19, wherein the second average distance between stitches is 10 percent to 50 percent greater than the first average distance between stitches.

Clause 21: The stitched article of Clause 20, wherein the second average distance between stitches is 20 percent to 40 percent greater than the first average distance between stitches.

Clause 22: The stitched article of any of the preceding Clauses, wherein the substrate is a textile including a first polymeric composition comprising one or more first polymers.

Clause 23: The stitched article of any of the preceding Clauses, wherein the thread includes a second polymeric composition comprising one or more second polymers.

Clause 24: The stitched article of Clause 23, wherein both the first polymeric composition of the textile and the second polymeric composition of the thread are thermoplastic compositions.

Clause 25: The stitched article of Clause 23 or 24, wherein both the one or more first polymers of first polymeric composition of the textile and the one or more second polymers of the second polymeric composition of the thread include a polyurethane, a polyester, a polyether, a polyamide, or a polyolefin.

Clause 26: The stitched article of Clause 22, wherein the textile is a non-woven textile.

Clause 27: The stitched article of any of the preceding Clauses, wherein the bundle of fibers includes at least one of carbon fibers, boron fibers, glass fibers, and synthetic polymer fibers.

Clause 28: The stitched article of Clause 27, wherein the synthetic polymer fibers comprise aramid fibers.

Clause 29: The stitched article of any of the preceding Clauses, wherein the stitched article comprises a second strand portion formed from a second bundle of fibers, and the second strand portion is attached to the substrate in the first region and in the second region via a series of stitches formed with a second thread.

Clause 30: The stitched article of any preceding Clause, wherein the first bundle of fibers comprises carbon fibers.

Clause 31: The stitched article of Clause 29 or 30, wherein the second bundle of fibers comprises glass fibers.

Clause 32: The stitched article of any of Clauses 29 to 31, wherein a concentration of the first bundle of fibers in the first region is at least 5 weight percent greater than a concentration of the first bundle of fibers in the second region.

Clause 33: The stitched article of any of Clauses 29 to 32, wherein a concentration of the second bundle of fibers in the second region is at least 5 weight percent greater than a concentration of the second bundle of fibers in the first region.

Clause 34: The stitched article of any of Clauses 23-33, wherein a melting temperature of the second polymeric composition of the thread is at least 20 degrees Celsius higher than a melting temperature of the first polymeric composition of the substrate.

Clause 35: The stitched article of any of the preceding Clauses, wherein the series of stitches crosses over the first strand portion.

Clause 36: The stitched article of any of the preceding Clauses, wherein the second region defines a flex zone having a greater flexibility than the first region.

Clause 37: The stitched article of Clause 36, wherein the flexibility of the second region is at least 5 percent greater than the flexibility of the first region.

Clause 38: The stitched article of Clause 37, wherein the flexibility of the second region is at least 10 percent greater than the flexibility of the first region.

Clause 39: The stitched article of Clauses 22-31 or 33-38, wherein the second concentration is greater than the first concentration.

Clause 40: The stitched article of any of the preceding Clauses, wherein the stitched article is a component of an article of footwear, an article of apparel, or an article of sporting equipment.

Clause 41: The stitched article of Clause 40, wherein the stitched article is a component of an article of footwear.

Clause 42: The stitched article of Clause 41, wherein the component of an article of footwear is a component of a plate of an article of footwear.

Clause 43: A stitched article comprising: a substrate having a first side and a second side, and a strand portion formed from a bundle of fibers; wherein the strand portion is attached to the substrate via a series of stitches formed with a thread, the strand portion forms a first layer on the substrate, the strand portion includes a first length extending in a direction between the first side and the second side and a second length extending in a direction between the first side and the second side, and the stitches have a different concentration along the first length than the second length.

Clause 44: The stitched article of Clause 43, wherein the stitches cross over the strand portion and penetrate the substrate at first attachment locations that are spaced apart from the strand portion.

Clause 45: The stitched article of Clause 43, wherein the stitches penetrate the strand portion.

Clause 46: The stitched article of any of the preceding Clauses, wherein the substrate includes a first end and a second end, the first length is located closer to the first end than the second length, and the first length has a greater concentration of the stitches than the second length.

Clause 47: The stitched article of Clause 46, wherein the substrate includes a flex zone at the first length, and the flex zone has a greater flexibility than other regions of the substrate.

Clause 48: The stitched article of any of the preceding Clauses, wherein the substrate is a textile including a first polymeric composition comprising one or more first polymers and the thread includes a second polymeric composition comprising one or more second polymers, wherein at least one of the one or more first polymers is the same as at least one of the one or more second polymers.

Clause 49: The stitched article of any of the preceding Clauses, wherein the bundle of fibers includes at least one of carbon fibers, boron fibers, glass fibers, and synthetic polymer fibers.

Clause 50: The stitched article of Clause 48 or 49, wherein both the first polymeric composition of the textile and the second polymeric composition of the thread are thermoplastic compositions.

Clause 51: The stitched article of Clause 48 or 50, wherein both the one or more first polymers of first polymeric composition of the textile and the one or more second polymers of the second polymeric composition of the thread include a polyurethane, a polyester, a polyether, a polyamide, or a polyolefin.

Clause 52: The stitched article of any of Clauses 48-51, wherein a melting temperature of the second polymeric composition of the thread is at least 20 degrees Celsius higher than a melting temperature of the first polymeric composition of the substrate.

Clause 53: The stitched article of any of the preceding Clauses, wherein the series of stitches crosses over the strand portion.

Clause 54: A stitched article comprising a substrate having a first side and a second side and a strand portion formed from a bundle of fibers, attached to the substrate via a series of stitches formed with a thread, forming a first layer on the substrate, and including a first length extending in a direction between the first side and the second side and a second length extending in a direction between the first side and the second side, a concentration of the stitches varying along at least one of the first length and the second length between the first side and the second side.

Clause 55: The stitched article of Clause 54, wherein the stitches cross over the strand portion and penetrate the substrate at first attachment locations that are spaced apart from the strand portion.

Clause 56: The stitched article of Clause 54, wherein the stitches penetrate the strand portion.

Clause 57: The stitched article of any of the preceding Clauses, wherein the substrate includes a first end and a second end, the first length being located closer to the first end than the second length and having a greater concentration of the stitches than the second length.

Clause 58: The stitched article of Clause 57, wherein the substrate includes a flex zone at the first length, the flex zone having a greater flexibility than other regions of the substrate.

Clause 59: The stitched article of any of the preceding Clauses, wherein the substrate is a textile including a first polymeric composition comprising one or more first polymers and the thread includes a second polymeric composition comprising one or more second polymers, wherein at least one of the one or more first polymers is the same as at least one of the one or more second polymers.

Clause 60: The stitched article of any of the preceding Clauses, wherein the bundle of fibers includes at least one of carbon fibers, aramid fibers, boron fibers, glass fibers, and polymer fibers.

Clause 61: The stitched article of any of the preceding Clauses, wherein the thread is formed from resin.

Clause 62: The stitched article of any of the preceding Clauses, wherein the thread is formed from the same material as the substrate.

Clause 63: The stitched article of any of the preceding Clauses, wherein a material forming the thread has a higher melting point than the substrate.

Clause 64: The stitched article of any of the preceding Clauses, wherein the series of stitches crosses over the strand portion.

Clause 65: A stitched article comprising a substrate having a first region and a second region and a strand portion formed from a bundle of fibers, attached to the substrate via a series of stitches formed with a thread, forming a first layer on the substrate, and including a plurality of lengths having longitudinal axes that extend in a direction between the first region and the second region and distal ends that terminate at respective locations on the substrate that are spaced apart from an edge of the substrate to define a flex zone of the substrate at the distal ends, the flex zone having a greater flexibility than other regions of the substrate.

Clause 66: The stitched article of Clause 65, wherein the distal ends cooperate to form a transition line that extends across a width of the substrate between a first side of the substrate and a second side of the substrate.

Clause 67: The stitched article of Clause 66, wherein the transition line is arcuate.

Clause 68: The stitched article of Clause 66, wherein the transition line is straight.

Clause 69: The stitched article of any of Clauses 66-68, wherein the transition line extends from the first side to the second side.

Clause 70: The stitched article of any of Clauses 66-69, wherein the substrate is exposed between the transition line and the edge.

Clause 71: The stitched article of Clause 65, wherein the substrate is exposed between the distal ends and the edge.

Clause 72: The stitched article of Clause 65, wherein the stitches cross over the strand portion and penetrate the substrate at first attachment locations that are spaced apart from the strand portion.

Clause 73: The stitched article of Clause 65, wherein the stitches penetrate the strand portion.

Clause 74: The stitched article of any of the preceding Clauses, wherein a concentration of the stitches is different along at least one of the plurality of lengths than the other of the plurality of lengths.

Clause 75: The stitched article of Clause 74, wherein a concentration of the stitches varies along a length of at least one of the lengths of the plurality of lengths.

Clause 76: The stitched article of Clause 65, wherein a concentration of the stitches varies along a length of at least one of the lengths of the plurality of lengths.

Clause 77: The stitched article of any of the preceding Clauses, wherein the substrate is a textile including a first polymeric composition comprising one or more first polymers and the thread includes a second polymeric composition comprising one or more second polymers, wherein at least one of the one or more first polymers is the same as at least one of the one or more second polymers.

Clause 78: The stitched article of any of the preceding Clauses, wherein the bundle of fibers includes at least one of carbon fibers, aramid fibers, boron fibers, glass fibers, and polymer fibers.

Clause 79: The stitched article of any of the preceding Clauses, wherein the thread is formed from resin.

Clause 80: The stitched article of any of the preceding Clauses, wherein the thread is formed from the same material as the substrate.

Clause 81: The stitched article of any of the preceding Clauses, wherein a material forming the thread has a higher melting point than the substrate.

Clause 82: The stitched article of any of the preceding Clauses, wherein the series of stitches crosses over the strand portion.

Clause 83: A stitched article comprising a substrate having a first region and a second region and a strand portion formed from a bundle of fibers, attached to the substrate via a series of stitches formed with a thread, forming a first layer on the substrate, and including a flex zone having a greater flexibility than other regions of the substrate, the stitches having a greater concentration along a length of the strand portion within the flex zone than in the other regions of the substrate.

Clause 84: The stitched article of Clause 83, wherein the flex zone defines a transition line that extends across a width of the substrate between a first side of the substrate and a second side of the substrate.

Clause 85: The stitched article of Clause 84, wherein the transition line is arcuate.

Clause 86: The stitched article of Clause 84, wherein the transition line is straight.

Clause 87: The stitched article of any of Clauses 84-86, wherein the transition line extends from the first side to the second side.

Clause 88: The stitched article of any of Clauses 84-87, wherein the substrate is exposed between the transition line and an edge of the substrate.

Clause 89: The stitched article of Clause 83, wherein the stitches cross over the strand portion and penetrate the substrate at first attachment locations that are spaced apart from the strand portion.

Clause 90: The stitched article of Clause 83, wherein the stitches penetrate the strand portion.

Clause 91: The stitched article of any of the preceding Clauses, wherein the substrate is a textile including a first polymeric composition comprising one or more first polymers and the thread includes a second polymeric composition comprising one or more second polymers, wherein at least one of the one or more first polymers is the same as at least one of the one or more second polymers.

Clause 92: The stitched article of any of the preceding Clauses, wherein the bundle of fibers includes at least one of carbon fibers, boron fibers, glass fibers, and synthetic polymer fibers.

Clause 93: The stitched article of any of the preceding Clauses, wherein the thread is formed from resin.

Clause 94: The stitched article of any of the preceding Clauses, wherein the thread is formed from the same material as the substrate.

Clause 95: The stitched article of any of the preceding Clauses, wherein a material forming the thread has a higher melting point than the substrate.

Clause 96: The stitched article of any of the preceding Clauses, wherein the series of stitches crosses over the strand portion.

Clause 97: A method of forming a stitched article, the method comprising positioning a substrate, depositing a strand portion formed from a bundle of fibers on the substrate, and attaching the strand portion to the substrate via a series of stitches formed with a thread such that a first region of the stitched article has a first concentration of stitches and a second region of the stitched article has a second concentration of stitches, wherein the first concentration of stitches is at least 10 percent greater than the second concentration of stitches.

Clause 98: The method of Clause 97, wherein the stitched article is a stitched article according to any of Clauses 1 to 96.

Clause 99: A method of forming a composite article, the method comprising positioning a stitched article in a mold, the stitched article including strand portions of bundles of fibers stitched to a substrate with a thread; while the stitched article is positioned in the mold, consolidating the substrate, the strand portion, and the stitches via a resin composition to form a composite article, and removing the composite article from the mold, wherein the composite article includes a first region and a second region, the second region including a flex zone having a greater flexibility than the first region.

Clause 100: The method of Clause 99, wherein the method further comprises forming the stitched article prior to the positioning the stitched article in the mold.

Clause 101: The method of Clause 100, wherein the forming the stitched article comprises depositing a strand portion formed from a bundle of fibers on a substrate, and attaching the strand portion via a series of stitches formed with a thread to the substrate in a first region having a first concentration of stitches and in a second region having a second region of stitches greater than the first concentration of stitches.

Clause 102: The method of Clause 101, wherein the stitched article is a stitched article according to any of Clauses 1 to 96.

Clause 103: The method of any of the preceding Clauses, wherein consolidating the substrate, the strand portion, and the stitching includes applying the resin composition to the substrate, the strand portion, and the stitching while the stitched article is positioned in the mold.

Clause 104: The method of Clause 99, wherein applying the resin composition includes combining first and second reactive compositions to form a liquid resin composition, and applying the liquid resin composition to the stitched article.

Clause 105: The method of Clause 104, wherein the liquid resin composition is a liquid epoxy resin composition.

Clause 106: The method of any of Clauses 103 to 105, further comprising curing the resin composition prior to removing the composite article from the mold.

Clause 107: The method of any of Clauses 103 to 106, wherein the resin composition is a thermoplastic resin composition contained within at least one of the substrate, the strand portion, and the thread of the stitched article, and consolidating the substrate, the strand portion, and the thread includes causing the resin composition to flow and infiltrate the fibers of the strand portion, followed by allowing the resin composition to re-solidify prior to removing the composite article from the mold.

Clause 108: The method of any of the preceding Clauses, wherein the method further comprises trimming a perimeter of the composite article.

Clause 109: The method of Clause 108, further comprising forming the substrate, the strand portion, and the stitching into a plate for an article of footwear.

Clause 110: The method of Clause 109, further comprising incorporating the plate into an article of footwear.

Clause 111: The method of Clause 99, wherein depositing the strand portion on the substrate includes positioning the strand portion in a plurality of lengths having longitudinal axes that extend in a direction between the first region and the second region, the plurality of lengths having distal ends that terminate at respective locations on the substrate that are spaced apart from an edge of the substrate to define the flex zone.

Clause 112: The method of Clause 99, wherein depositing the strand portion on the substrate includes positioning the strand portion in a plurality of lengths having a first substantially straight portion within the first region and an arcuate portion within the second region that defines the flex zone.

Clause 113: The method of Clause 99, further comprising aligning arcuate portions of adjacent lengths to define the flex zone.

Clause 114: The method of any of the preceding Clauses, wherein attaching the strand portion via a series of stitches formed with a thread includes causing the stitches to cross over the strand portion and penetrate the substrate at first attachment locations that are spaced apart from the strand portion.

Clause 115: The method of Clauses 99-108, wherein attaching the strand portion via a series of stitches formed with a thread includes causing the stitches to penetrate the strand portion.

Clause 116: A method of manufacturing an article of footwear, apparel or sporting equipment, the method comprising positioning a composite article, the composite article comprising a stitched article having strand portions of bundles of fibers stitched to a substrate with a thread, the wherein the fibers are consolidated by a resin composition, wherein the composite article is a component of an article of footwear, apparel or sporting equipment, and affixing the composite article and a second component to each other, wherein the second component is a second component of an article of footwear, apparel or sporting equipment.

Clause 117: The method of Clause 116, wherein the composite article is a component of an article of footwear, and the second component is a second component of an article of footwear.

Clause 118: The method of Clause 117, wherein the composite article is a plate for an article of footwear.

Clause 119: A composite article comprising: a stitched article according to any of Clauses 1 to 96 and a resin composition, wherein the resin composition consolidates fibers of at least the first bundle of fibers of the strand portion.

Clause 120: The composite article of clause 119, wherein the resin composition consolidates the fibers of at least the first bundle of fibers of the strand portion, fibers and/or a yarn of the substrate, and thread of the stitched article.

Clause 121: The composite article of Clause 119 or 120, wherein the resin composition is a thermoset resin composition, and the thermoset resin composition optionally comprises an epoxy resin.

Clause 122: The composite article of any of Clauses 119-121, wherein the resin composition is a thermoplastic resin composition, and the thermoplastic resin composition optionally comprises a thermoplastic polyurethane, a thermoplastic polyester, a thermoplastic polyether, a thermoplastic polyamide, a thermoplastic polyolefin, or any combination thereof.

Clause 123: The composite article of any of Clauses 119 to 122, wherein the composite article is a plate for an article of footwear.

Clause 124: The plate for an article of footwear of Clause 123, wherein the plate comprises a plurality of traction elements; and one or more of the plurality of traction elements optionally includes a tip configured to be ground-contacting, and optionally wherein the tip is formed from a different polymeric material than the resin composition of the plate.

Clause 125: A method of forming a plate for an article of footwear including positioning a substrate, depositing a strand portion formed from a bundle of fibers on the substrate, and attaching the strand portion to the substrate via a series of stitches formed with a thread such that a first region of the stitched article has a first concentration of stitches and a second region of the stitched article has a second concentration of stitches, wherein the first concentration of stitches is at least 10 percent greater than the second concentration of stitches.

Clause 126: The method of Clause 125, wherein the method further comprises positioning the stitched article in a mold, disposing a liquid resin composition between and around a plurality of fibers of the bundle of fibers stitched to the substrate, solidifying the liquid resin composition, consolidating the plurality of fibers with solid resin composition and forming a composite plate for an article of footwear, and removing the composite plate from the mold.

Clause 127: The method of Clause 126, further comprising disposing at least one traction element in the mold prior to disposing the liquid resin composition and attaching the traction element to the composite plate prior to removing the composite plate from the mold.

Clause 128: The method of Clauses 125-127, further comprising incorporating the plate into a sole structure of the article of footwear.

Clause 129: The method of Clauses 125-127, further comprising incorporating the plate into the article of footwear.

Clause 130: A plate formed by the method of any of Clauses 125-127.

Clause 131: A sole structure formed by the method of any of Clauses 125-127.

Clause 132: An article of footwear formed by the method of any of Clauses 125-127.

Clause 133: A method of forming a composite plate for an article of footwear including positioning a stitched article in a mold, the stitched article including strand portions of bundles of fibers stitched to a substrate with a thread, wherein a first region of the stitched article has a first concentration of stitches and a second region of the stitched article has a second concentration of stitches, wherein the first concentration of stitches is at least 10 percent greater than the second concentration of stitches, while the stitched article is positioned in the mold, disposing a resin composition between and around a plurality of fibers of the bundle of fibers stitched to the substrate, consolidating the plurality of fibers with the resin composition and forming a composite plate for an article of footwear including a first region and a second region, the second region including a flex zone having a greater flexibility than the first region, and removing the composite plate from the mold.

Clause 134: The method of Clause 133, wherein the method further comprises forming the stitched article prior to the positioning the stitched article in the mold.

Clause 135: The method of Clauses 133-134, further comprising incorporating the plate into a sole structure of the article of footwear.

Clause 136: The method of Clauses 133-134, further comprising incorporating the plate into the article of footwear.

Clause 137: A plate formed by the method of any of Clauses 133-134.

Clause 138: A sole structure formed by the method of any of Clauses 133-134.

Clause 139: An article of footwear formed by the method of any of Clauses 133-134.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for forming a plate for an article of footwear, the method comprising:
   forming a stitched article including:
      providing a substrate with a first region and a second region; and
      attaching a first strand portion formed from a first bundle of fibers to the substrate in the first region and in the second region via a series of stitches formed with a first thread by crossing the stitches over the first strand portion and penetrating the substrate at first attachment locations that are spaced apart from the first strand portion to form a first layer on the substrate, the stitched article having a first concentration of the stitches in the first region along a first length of the first strand portion and a second concentration of the stitches different than the first concentration in the second region along a second length of the first strand portion.

2. The method of claim 1, further comprising consolidating at least one of (i) fibers of at least the first bundle of fibers of the first strand portion, (ii) fibers and/or a yarn of the substrate, and (iii) the first thread of the stitched article with a resin composition.

3. The method of claim 1, further comprising extending the first length of the first strand portion in a direction between a medial side of the substrate and a lateral side of the substrate.

4. The method of claim 3, further comprising extending the second length of the first strand portion in a direction between the medial side of the substrate and the lateral side of the substrate.

5. The method of claim 1, wherein the first concentration is greater than the second concentration.

6. The method of claim 1, further comprising providing a first average distance between stitches in the first region that is greater than a second average distance between stitches in the second region.

7. The method of claim 1, wherein attaching the first strand portion formed from the first bundle of fibers to the substrate includes attaching a first bundle of fibers including at least one of carbon fibers, boron fibers, glass fibers, and synthetic polymer fibers.

8. The method of claim 1, wherein forming the stitched article includes attaching a second strand portion formed from a second bundle of fibers to the substrate in the first region and in the second region via a series of stitches formed with a second thread.

9. The method of claim 8, wherein attaching the first strand portion formed from the first bundle of fibers to the substrate includes attaching a first bundle of fibers including carbon fiber, and attaching the second strand portion formed from the second bundle of fibers to the substrate includes attaching a second bundle of fibers including glass fibers.

10. The method of claim 1, further comprising attaching a plurality of traction elements to a side of the plate.

11. A method for forming a plate for an article of footwear, the method comprising:
   forming a stitched article including:
      providing a substrate with a first region and a second region;
      extending a first length of a first strand portion formed from a first bundle of fibers in a direction between a medial side of the substrate and a lateral side of the substrate; and
      attaching the first strand portion to the substrate in the first region and in the second region via a series of stitches formed with a first thread to form a first layer on the substrate, the stitched article having a first concentration of the stitches in the first region along the first length of the first strand portion and a second concentration of the stitches different than the first concentration in the second region along a second length of the first strand portion.

12. The method of claim 11, further comprising extending the second length of the first strand portion in a direction between the medial side of the substrate and the lateral side of the substrate.

13. The method of claim 11, wherein the first concentration is greater than the second concentration.

14. A method for forming a plate for an article of footwear, the method comprising:
   forming a stitched article including:
      providing a substrate with a first region and a second region; and
      attaching a first strand portion formed from a first bundle of fibers to the substrate in the first region and in the second region via a series of stitches formed with a first thread to form a first layer on the substrate, the stitched article having a first concentration of the stitches in the first region along a first length of the first strand portion and a second concentration of the stitches less than the first concentration in the second region along a second length of the first strand portion.

15. The method of claim 14, wherein attaching the first strand portion formed from the first bundle of fibers to the substrate includes attaching a first bundle of fibers including at least one of carbon fibers, boron fibers, glass fibers, and synthetic polymer fibers.

16. The method of claim 14, wherein forming the stitched article includes attaching a second strand portion formed from a second bundle of fibers to the substrate in the first region and in the second region via a series of stitches formed with a second thread.

17. Method for forming a plate for an article of footwear, the method comprising:
   forming a stitched article including:
      providing a substrate with a first region and a second region; and
      attaching a first strand portion formed from a first bundle of fibers to the substrate in the first region and in the second region via a series of stitches formed with a first thread to form a first layer on the substrate, the stitched article having a first average distance between the stitches in the first region along a first length of the first strand portion and a second average distance between the stitches that is less than the first average distance in the second region along a second length of the first strand portion.

18. The method of claim 17, wherein attaching the first strand portion formed from the first bundle of fibers to the substrate includes attaching a first bundle of fibers including at least one of carbon fibers, boron fibers, glass fibers, and synthetic polymer fibers.

19. The method of claim 17, wherein forming the stitched article includes attaching a second strand portion formed from a second bundle of fibers to the substrate in the first region and in the second region via a series of stitches formed with a second thread.

\* \* \* \* \*